United States Patent [19]

Hasegawa et al.

[11] Patent Number: 5,206,953
[45] Date of Patent: Apr. 27, 1993

[54] DATA COMMUNICATION SYSTEM

[75] Inventors: Yutaka Hasegawa, Tokyo; Syuichi Yamazaki, Fujimi, both of Japan

[73] Assignee: Ricoh Company, Ltd., Tokyo, Japan

[21] Appl. No.: 733,975

[22] Filed: Jul. 22, 1991

Related U.S. Application Data

[63] Continuation of Ser. No. 273,461, Nov. 18, 1988, abandoned.

[30] Foreign Application Priority Data

Nov. 18, 1987 [JP] Japan .................... 62-289383

[51] Int. Cl.⁵ .................. G06F 13/14; G06F 13/24; G03B 27/00
[52] U.S. Cl. .................. 395/775; 395/550; 364/228.3; 364/229; 364/230; 364/242; 364/263.2; 364/270.7; 364/DIG. 1; 355/18
[58] Field of Search .................. 364/200, 900, DIG. 1, 364/DIG. 2; 340/825.79; 370/85.1; 355/18; 395/550, 775, 325

[56] References Cited

U.S. PATENT DOCUMENTS

| 4,086,658 | 4/1978 | Finlay | 395/425 |
| 4,100,601 | 7/1978 | Kaufman et al. | 395/275 |
| 4,188,668 | 2/1980 | Finlay | 364/DIG. 1 |
| 4,314,334 | 2/1982 | Daughton et al. | 395/325 |
| 4,409,656 | 10/1983 | Anderson et al. | 395/275 |
| 4,455,621 | 6/1984 | Pelley et al. | 364/140 |
| 4,623,244 | 11/1986 | Andrews et al. | 355/24 |
| 4,847,867 | 7/1989 | Nasu et al. | 370/85.1 |

*Primary Examiner*—Michael R. Fleming
*Assistant Examiner*—Ayaz R. Sheikh
*Attorney, Agent, or Firm*—Oblon, Spivak, McClelland, Maier & Neustadt

[57] ABSTRACT

A data communication system having serial data communication circuits and interrupt data communication circuits and allowing a plurality of CPUs to interchange data with each other. While a plurality of different kinds of data are interchanged by serial communication which occurs at predetermined intervals, only urgent data is interchanged by interrupt signals particular to interrupt communication. Whether or not to validate an interrupt signal (whether or not to mask an interrupt) is determined on the basis of data sent by serial data communication.

4 Claims, 29 Drawing Sheets

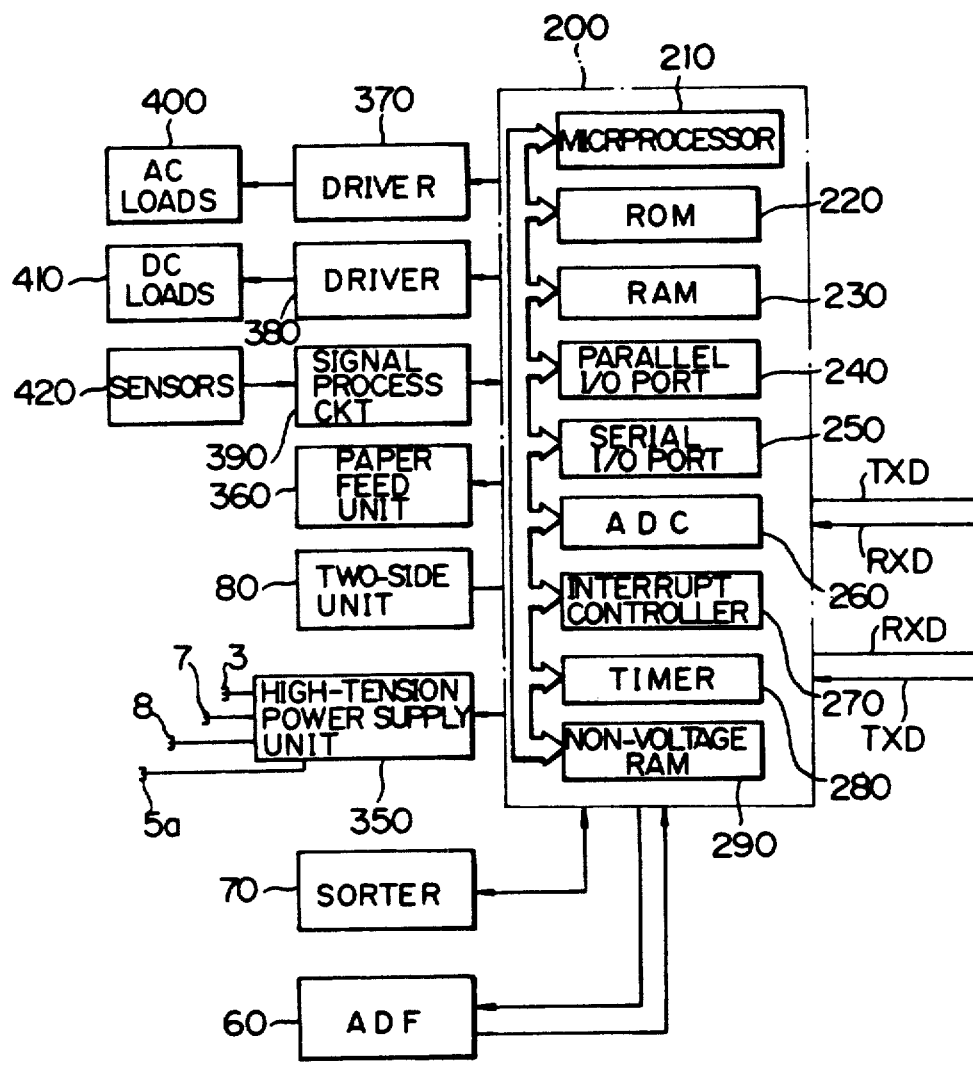

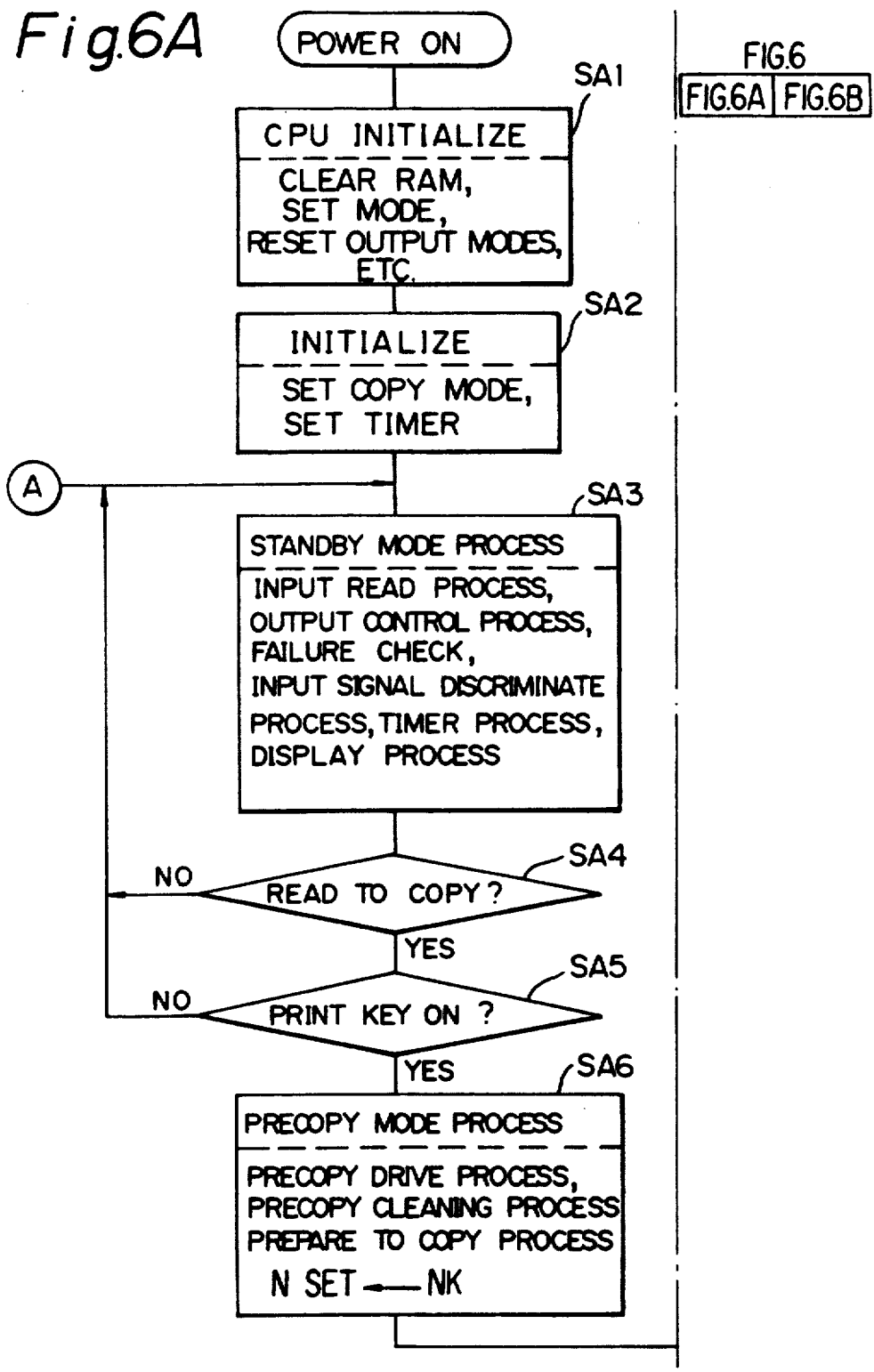

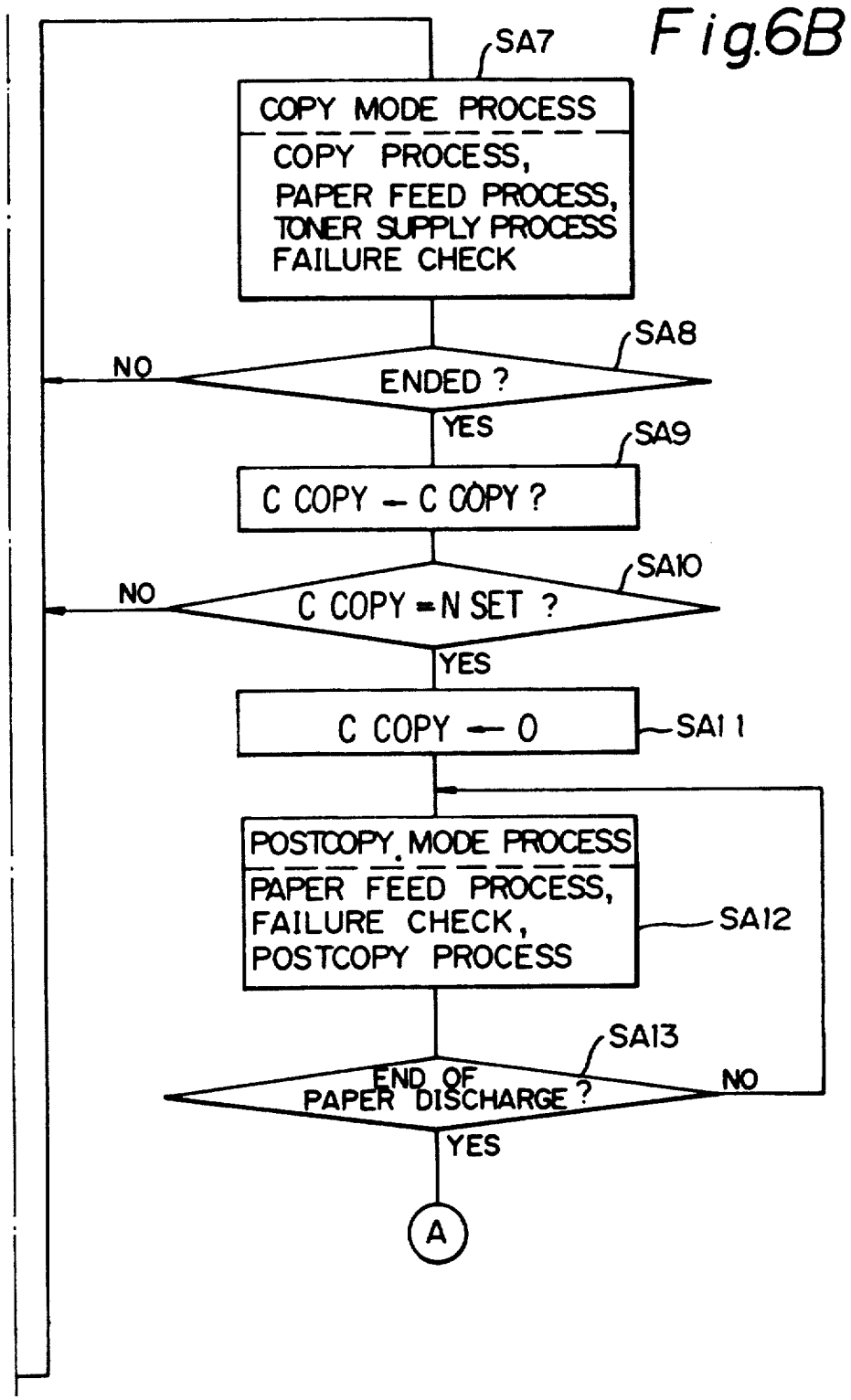

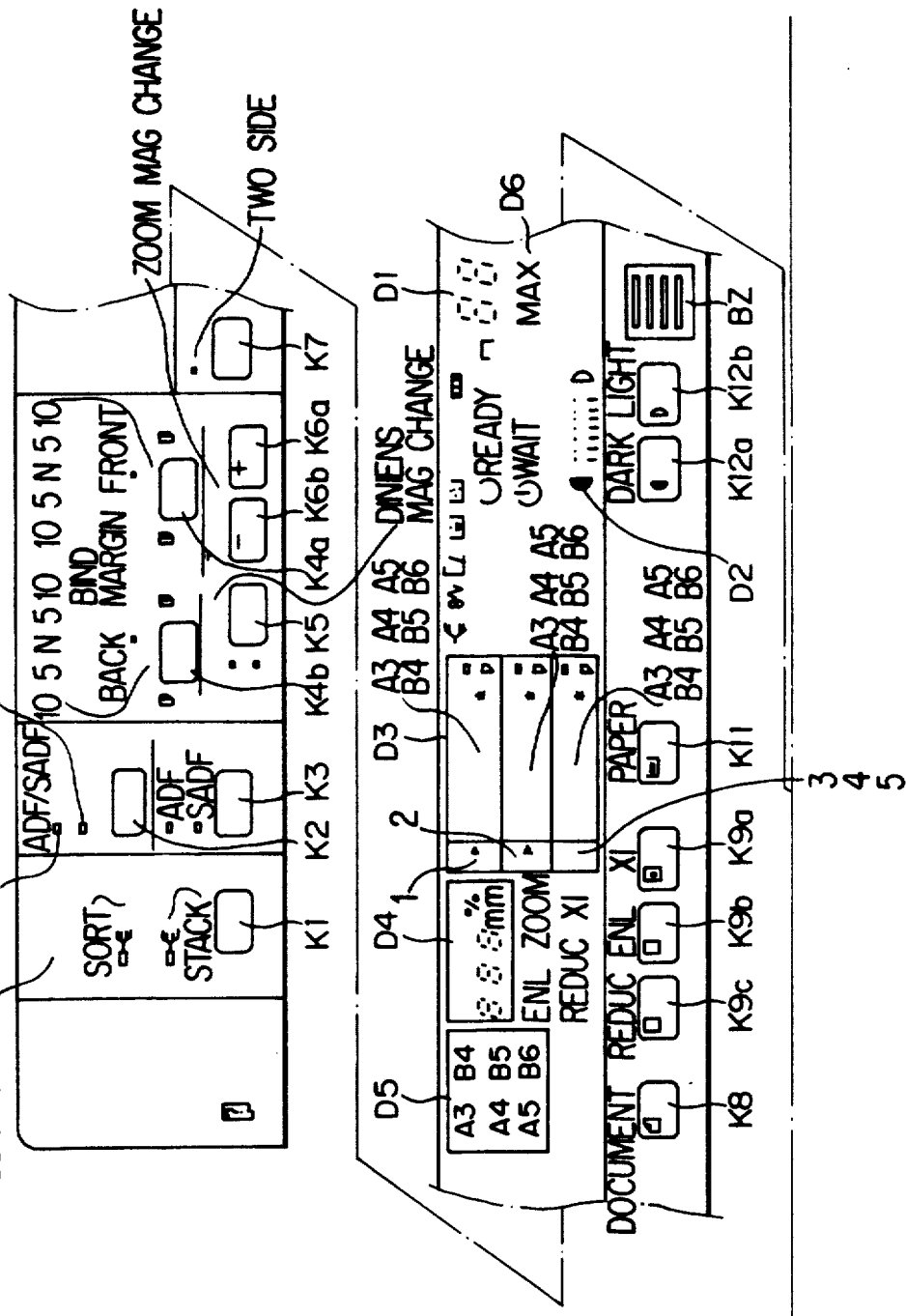

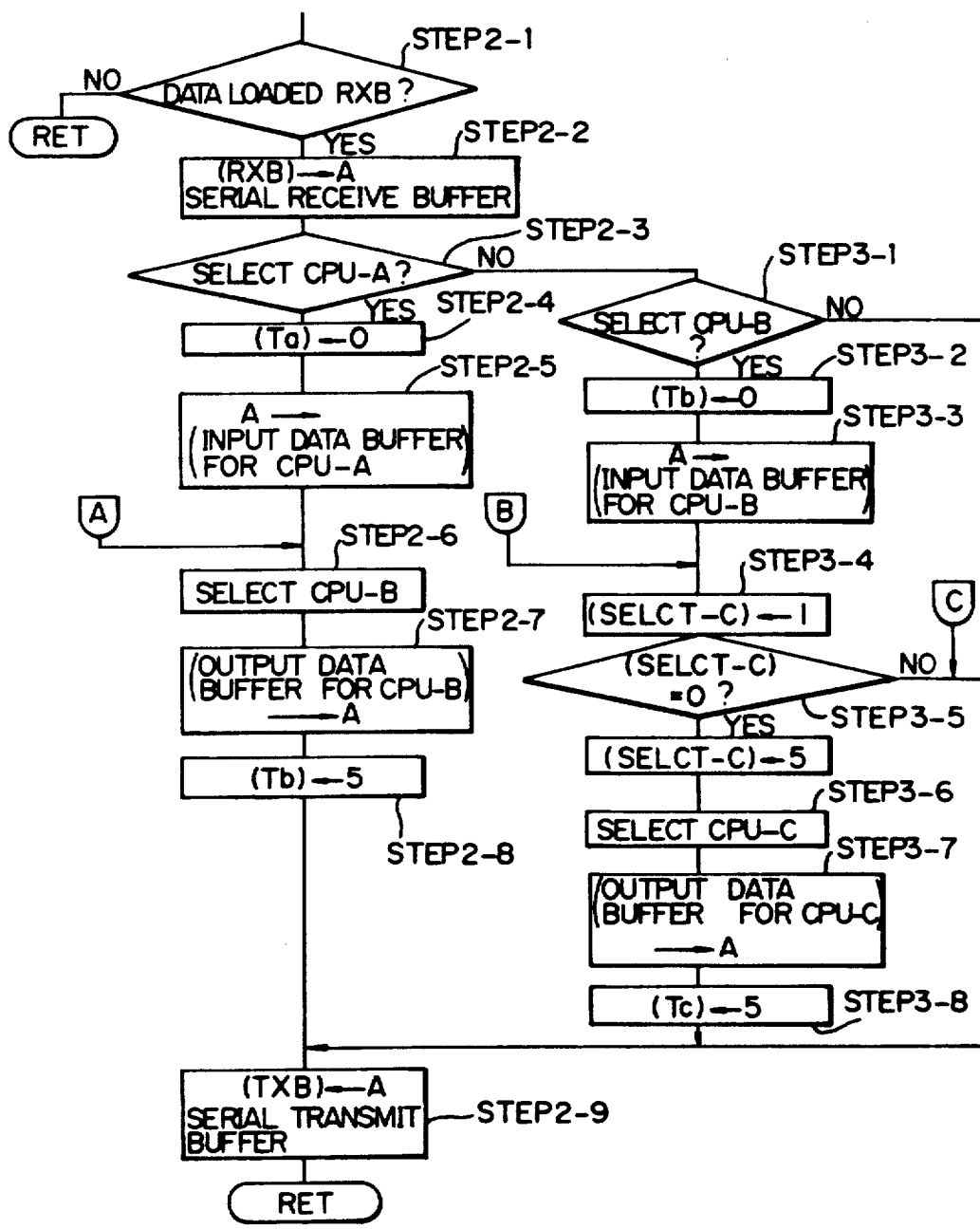

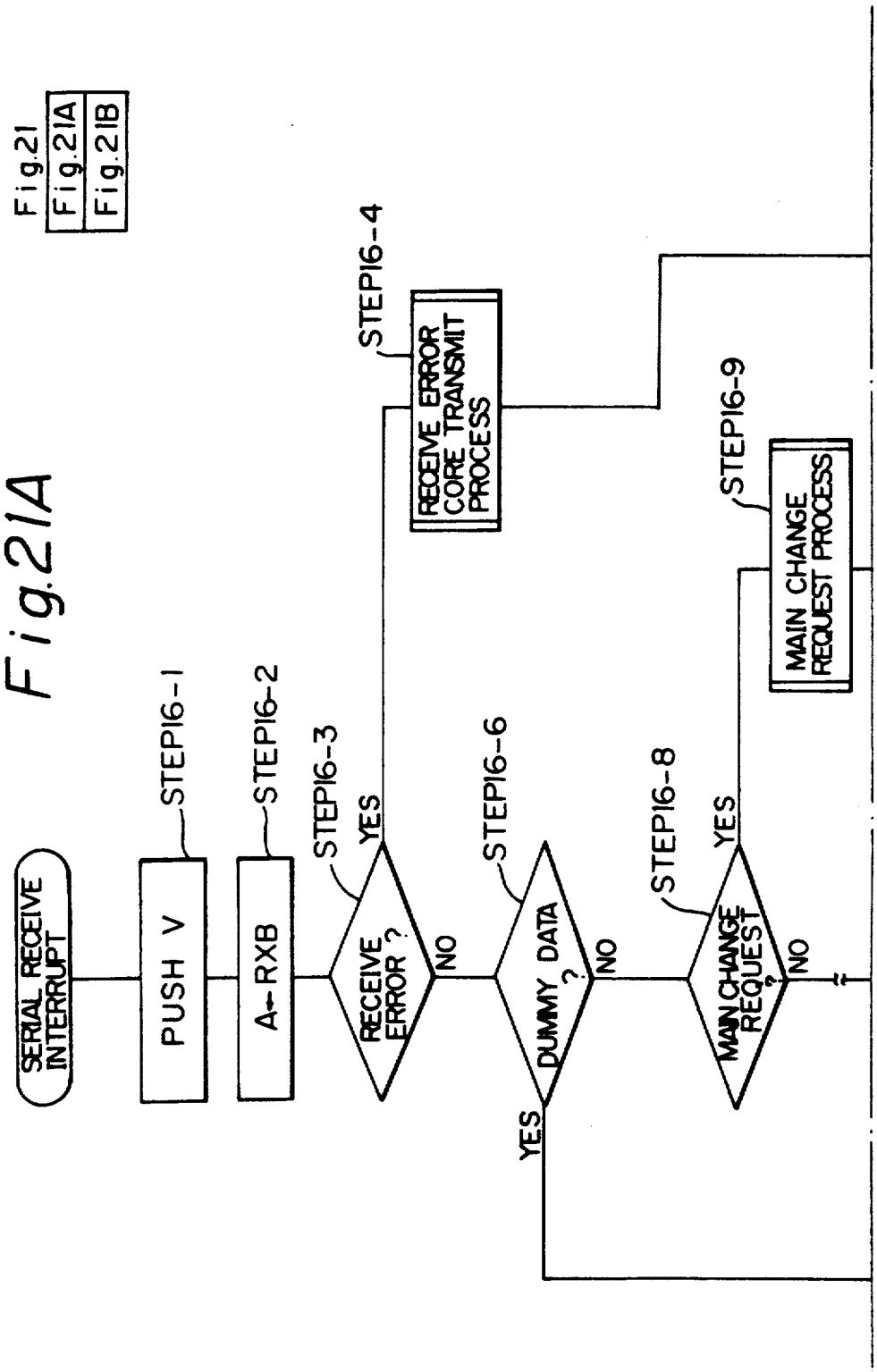

Fig.22A

MAIN-TO-OPTICS DATA 7 6 5 4 3 2 1 0 (BIT)

| | | | | | | | | |
|---|---|---|---|---|---|---|---|---|
| 0 | 7-BIT MAG CHANGE DATA | | | | | | | (60%~155%)+FIXED MAG (19 LEVELS) |
| 1 | 0 | 0 | 0 | 1-BIT DATA | | | | LENS CORRECTION : X1 |
| 1 | 0 | 0 | 1 | · | | | | LENS CORRECTION : FOCAL DISTANCE |
| 1 | 0 | 1 | 0 | · | | | | LONGITUDINAL MAG CORRECTION |
| 1 | 1 | 0 | 0 | 0 | 0 | 0 | 0 | DOCUMENT DETECT MODE START |
| 1 | 1 | 0 | 0 | 0 | 0 | 0 | 1 | APS LENGTH A/D DATA (1) SEND REQUEST |
| 1 | 1 | 0 | 0 | 0 | 0 | 1 | 0 | APS WIDTH A/D DATA(2) SEND REQUEST |
| 1 | 1 | 0 | 0 | 0 | 0 | 1 | 1 | SET SHEET-THROUGH MODE |
| 1 | 1 | 0 | 0 | 0 | 1 | 0 | 0 | RESET SHEET-THROUGH MODE |
| 1 | 1 | 0 | 0 | 0 | 1 | 0 | 1 | SET SHEET-THROUGH MODE P SENSOR CHECK |
| 1 | 1 | 0 | 0 | 0 | 1 | 1 | 0 | RESET SHEET-THROUGH MODE P SENSOR CHECK |
| 1 | 1 | 0 | 0 | 0 | 1 | 1 | 1 | CANCEL INTERRUPT MASK |
| 1 | 1 | 0 | 0 | 1 | 0 | 0 | 0 | MASK INTERRUPT |
| 1 | 1 | 1 | 1 | 1 | 1 | 1 | 1 | DUMMY |

Fig. 22B

OPTICS-TO-MAIN DATA

```
7 6 5 4 3 2 1 0  (BIT)

0 0 0 | DATA 1    |     APS LENGTH DATA 1
0 0 1 | DATA 2    |     APS WIDTH DATA 2
0 1 0 | LOWER 5 BITS |  DOCUMENT SIZE 1
0 1 1 | 1/0 UPPER 4 BITS | DOCUMENT SIZE 2
      W PRESENT  ABSENT
```

|  |  |  |  |  |  |  |  | |
|---|---|---|---|---|---|---|---|---|
| 1 | 1 | 1 | 0 | 0 | 0 | 0 | 1 | REACHED H.P |
| 1 | 1 | 1 | 1 | 0 | 0 | 0 | 0 | H.P1 REMAINING HIGH |
| 1 | 1 | 1 | 1 | 0 | 0 | 0 | 1 | H.P1 REMAINING LOW |
| 1 | 1 | 1 | 1 | 0 | 0 | 1 | 0 | H.P2 REMAINING HIGH |
| 1 | 1 | 1 | 1 | 0 | 0 | 1 | 1 | H.P2 REMAINING LOW |
| 1 | 1 | 1 | 1 | 0 | 1 | 0 | 0 | LENS HP REMAINING HIGH |
| 1 | 1 | 1 | 1 | 0 | 1 | 0 | 1 | LENS HP REMAINING LOW |
| 1 | 1 | 1 | 1 | 0 | 1 | 1 | 0 | MIRR HP REMAINING HIGH |
| 1 | 1 | 1 | 1 | 0 | 1 | 1 | 1 | MIRR HP REMAINING LOW |
| 1 | 1 | 1 | 1 | 1 | 0 | 0 | 0 | ENCODER PULSE LARGE |
| 1 | 1 | 1 | 1 | 1 | 0 | 0 | 1 | ENCODER PULSE SMALL |
| 1 | 1 | 1 | 1 | 1 | 0 | 1 | 0 | UNUSUAL ENCODE PULSE |
| 1 | 1 | 1 | 0 | 0 | 0 | 0 | 0 | DUMMY |
| 1 | 1 | 1 | 0 | 0 | 0 | 1 | 0 | TRANSMISSION ERROR |

FAILURE CODE

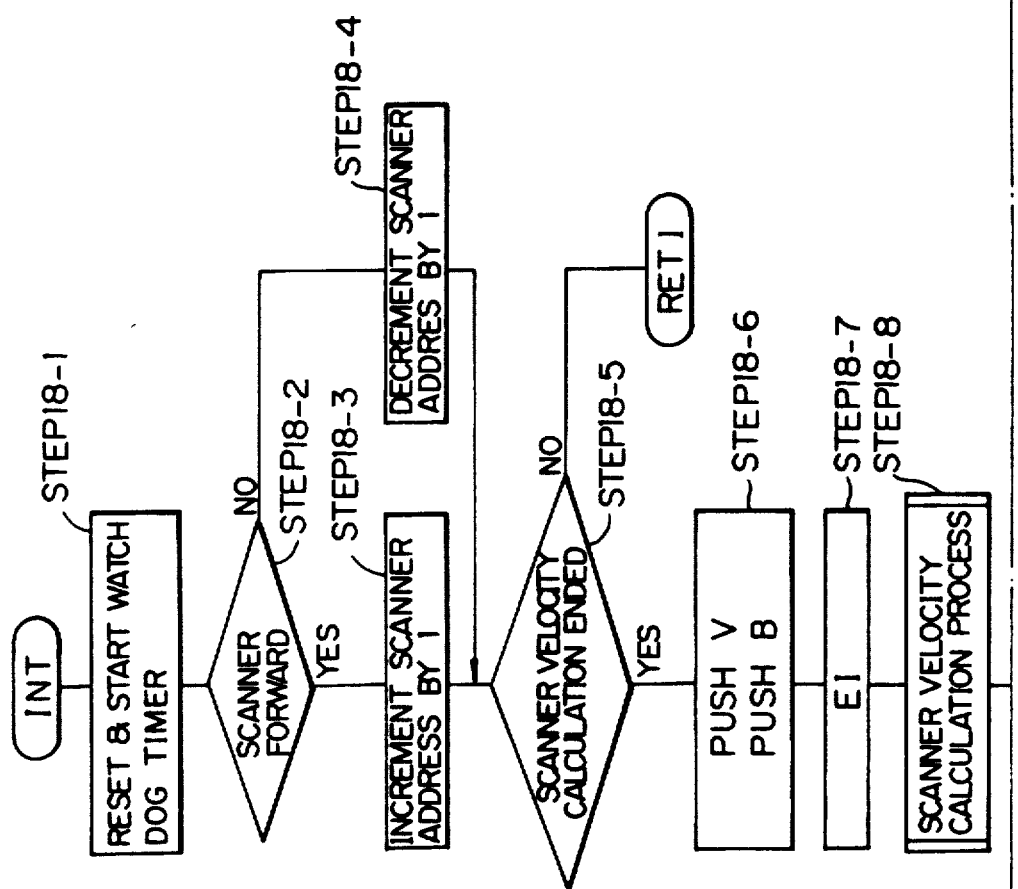

DATA COMMUNICATION SYSTEM

This application is a continuation of application Ser. No. 07/273,461, filed on Nov. 18, 1988, now abandoned.

BACKGROUND OF THE INVENTION

The present invention relates to a data communication system and, more particularly, to a data communication system applicable to a copier for implementing the interchange of data between a master CPU (Central Processing Unit) and a CPU which supervises optics.

Inexpensive and high performance CPUs are available in various forms today, thanks to the recent progress in the semiconductors art. Hence, a current trend is toward a distributed control system which controls a machine by using a plurality of CPUs in place of a single CPU type control system. When a pluality of CPUs are used in combination, it is necessary for them to interchange data with each other and this kind of data communication has heretofore been implemented by any of three different systems: a parallel data communication system, a serial data communication system, and an interrupt data communication system. A parallel data communication system is such that a plurality of signals, e.g., eight bits or one byte in the case of an 8-bit CPU are transmitted transmitted or received at the same time. Although this kind of communication system is advantageous over a serial communication system because it allows a large amount of data to be interchanged within a short period of time, it needs a plurality of ports and therefore has to withstand a substantial load with respect to hardware (buffers, connectors, harness, etc). The serial data communication has a drawback that sequentially feeding a pluality of signals over a single line results in a lower rate of data communication than with the parallel data communication and is therefore unsuitable for mass data communication. The interrupt data communication system is higher than the other systems mentioned above with respect to the data communication rate. However, this type of system is unfeasible for the interchange of a plurality of different kinds of data because a CPU usually has only one or two interrupt terminals. When the interrupt terminals are used, there is a fear that unexpected signals are accepted due to noise.

SUMMARY OF THE INVENTION

It is therefore an object of the present invention to eliminate the drawbacks particular to the prior art data communication systems as discussed above.

It is another object of the present invention to provide a data communication system having an improved communication efficiency.

It is another object of the present invention to provide a data communication system which eliminates malfunctions and thereby enhances reliable operations.

It is another object of the present invention to provide a data communication system which is implemented by simple hardware and inexpensive.

It is another object of the present invention to provide a generally improved data communication system.

In a data communication system having serial data communication means and interrupt data communication means and allowing a plurality of central processing units (CPUs) to interchange data with each other, in accordance with the present invention, ordinary data are interchanged by a serial data communication system while urgent data are interchanged by using interrupt signals of an interrupt data communication system, and whether or not to accept the interrupt signals is determined depending upon the ordinary data which are interchanged by the serial data communication system.

BRIEF DESCRIPTION OF THE DRAWINGS

The above and other objects, features and advantages of the present invention will become more apparent from the following detailed description taken with the accompanying drawings in which:

FIG. 6, consisting of FIGS. 6A and 6B is a flowchart demonstrating a specific operation of a microprocessor which is shown in FIG. 5;

FIGS. 22A and 22B show respectively data transmitted from the main control to the optics control and their contents and data transmitted from the optics to the main control and their data;

DESCRIPTION OF THE PREFERRED EMBODIMENT

To better understand the present invention, data communication systems available for the interchange of data between a pluality of CPUs will be outlined.

Figure 1:
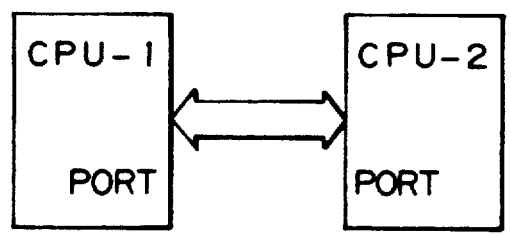
FIGS. 1, 2 and 3 are prior art schematic block diagrams showing respectively a parallel data communication system, a serial data communication system, and an interrupt data communication system.
Figure 2:
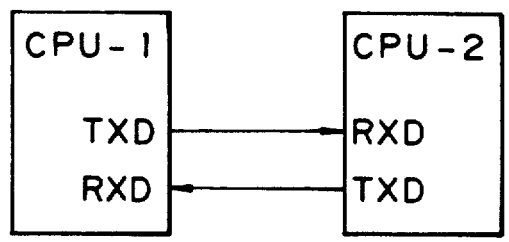
Figure 3:
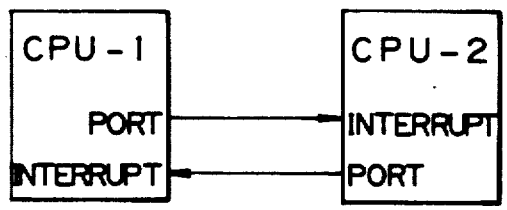

FIG. 1 shows the principle of a parallel data communication system. This system is such that a plurality of signals, e.g., eight bits or one byte in the case of an 8-bit CPU are transmitted or received at the same time. Although this kind of communication system is advantageous over a serial communication system because it allows a large amount of data to be interchanged within a short period of time, it needs a plurality of ports and therefore has to withstand a substantial load with respect to hardware (buffers, connectors, harness, etc). FIG. 2 shows a serial data communication system which has a drawback that sequentially feeding a plurality of signals over a single line needs results in a lower rate of data communication than with the parallel data communication and is therefore unsuitable for mass data communication. Further, FIG. 3 shows an interrupt data communication system which is higher than the other systems mentioned above with respect to the data communication rate. However, this type of system is unfeasible for the interchange of a plurality of different kinds of data because a CPU usually has only one or two interrupt terminals. When the interrupt terminals are used, there is a fear that unexpected signals are accepted due to noise.

Hereinafter will be described a preferred embodiment of the data communication system in accordance with the present invention which eliminates the drawbacks particular to the prior art as discussed above.

Figure 4:
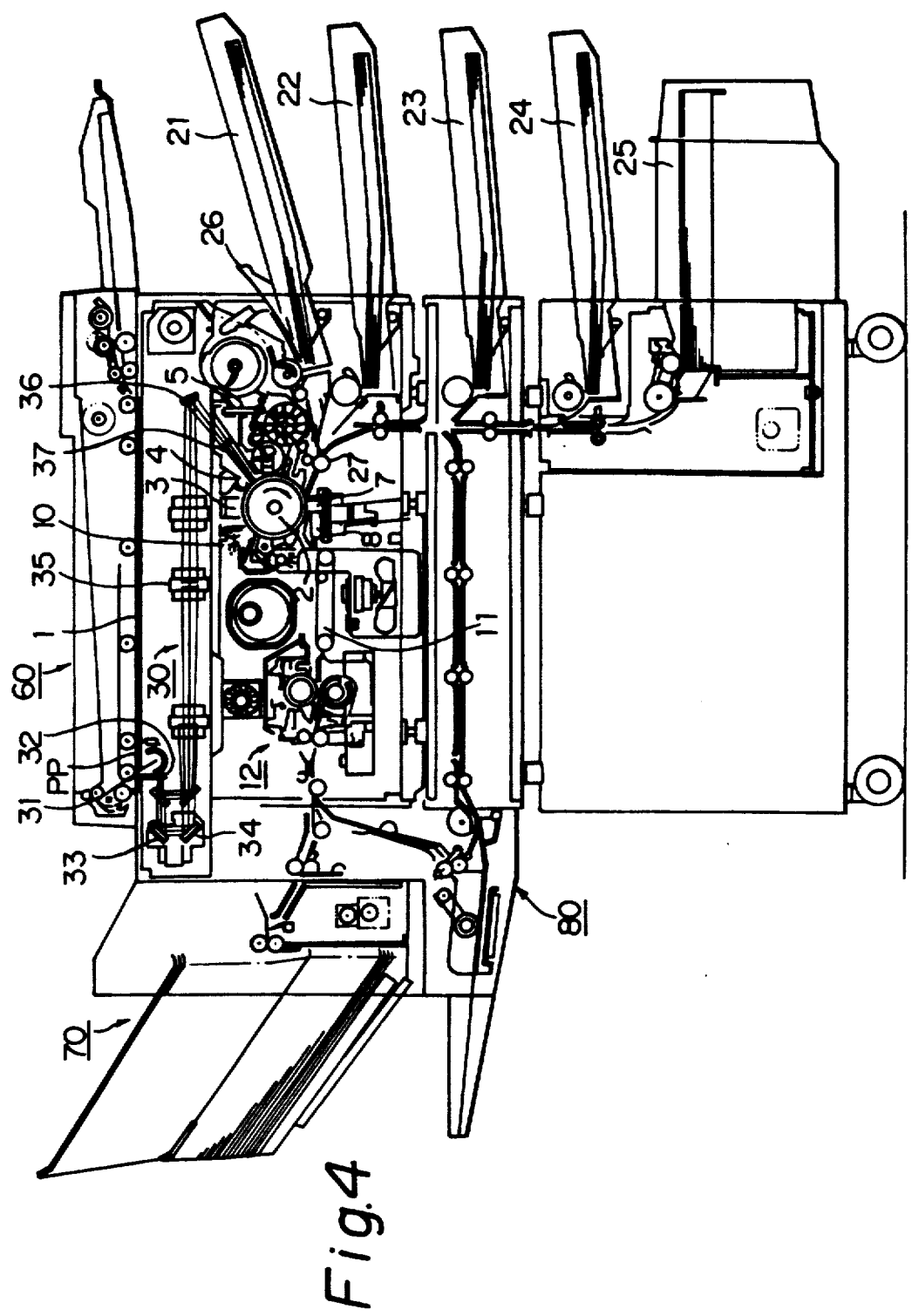
FIG. 4 is a schematic view exemplarily showing a copier to which the present invention is applied.

Referring to FIG. 4, there is shown the general construction of a copier to which the embodiment of the present invention is applied. The copier is shown as including a copier body (no numeral) and various optional units such as an ADF (Automatic Document Feeder) 60, a sorter 70 and an automatic two-side unit 180. A mechanism for feeding paper sheets includes five paper cassettes or trays 21, 22, 23, 24 and 25 each being loaded with a different size of paper sheets. A glass platen 1 for laying an original document thereon is mounted on the top of the copier body while an optical scanning system 30 is disposed below the glass platen 1. The scanning system 30 includes a lamp 31 for exposure, a first mirror 32, a second mirror 33, a third mirror 34, a lens 35, a fourth mirror 36, and a slit 37. A first carriage is loaded with the lamp 31 and first mirror 32, and a second carriage is loaded with the second mirror 33 and third mirror 34. During scanning operation, the first and second carriages are mechanically moved at a relative speed of 2:1 so that the length of the optical path may not change. To change the magnification, the lens 35 and the second carriage loaded with the second mirror 33 and third mirror 34 are shifted by a stepping motor. Light issuing from the lamp 31 is reflected by the document on the glass platen 1 and then routed through the first to third mirrors 32, 33 and 34, lens 35, fourth mirror 36 and slit 37 to be focused on a photoconductive drum 2. Arranged around the drum 2 are a main charger 3, an eraser 4, a developing unit 5, a transfer charger 7, a cleaning unit 10, etc.

A procedure for reproducing an image will be briefly described. The main charger 3 uniformly charges the surface of the drum 2 to a predetermined high potential. The charge in those portions of the drum 2 which do not join in the image reproduction is erased by the eraser 4. As the imagewise light from the document is focused on the charged surface of the drum 2, the potential on the drum surface is changed (lowered) in association with the intensity of incident light. While the drum 2 is rotated as indicated by an arrow in FIG. 4, the scanning system 30 sequentially scans the document on the glass platen 1. As a result, a latent image in the form of a potential distribution is electrostatically formed on the surface of the drum 2 in conformity to the density distribution (reflectance distribution) of the document image. When that portion of the drum 2 where the latent image is brought to the vicinity of the developing unit 5, toner stored in the developing unit 5 is transferred to the surface of the drum 2 on the basis of the potential distribution on the drum 2 so as to produce a toner image. A paper sheet is fed from desired one of the five paper cassettes or trays 21 to 25 in synchronism with the copying cycle. The paper sheet is driven by a register roller 27 such that it is laid on the surface of the drum 2 at a predetermined timing. The toner image is transferred by the transfer charger 7 from the drum 2 to the paper sheet and then separated by the separation charger 8 from the drum 2. The paper sheet with the toner image is transported by a belt 11 to a fixing unit 12 so that the toner image is fixed on the paper sheet. The paper sheet coming out of the fixing unit 12 is routed through a predetermined path to the sorter 70 or to the two-side unit 80 as the case may be.

Figure 5B:
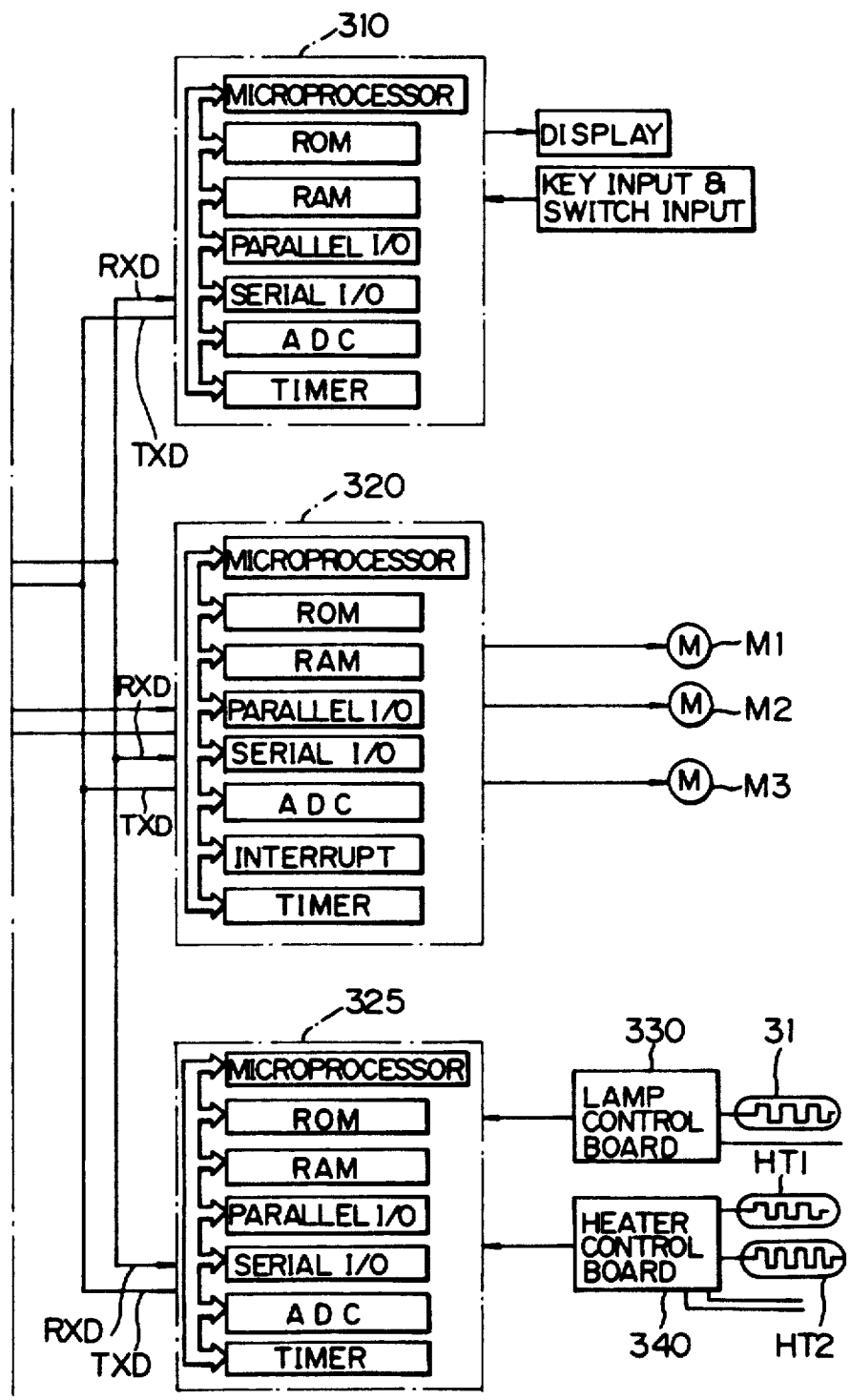
FIG. 5, consisting of FIGS. 5A and 5B, is a block diagram schematically showing a circuit arrangement which is built in the copier of FIG. 4.

Referring to FIG. 5, electric circuitry built in the copier of FIG. 4 is shown. In the figure, a main control board (master CPU) 200 includes a microprocessor 210, a read only memory (ROM) 220, a random access memory (RAM) 230, a parallel input/output (I/O) port 240, a serial I/O port 250, an analog-to-digital converter (ADC) 260, an interrupt controller 270, a timer 280, and a non-volatile RAM 290 (recently, a CPU with most of such devices accommodated in one chip is available). Connected to the main board 200 are an operation board (slave CPU-A) 310, an optics control board (slave CPU-C) 320, an AC system control board (slave CPU-B) for controlling a lamp control board 330 and a heater control board 340, a high-tension power supply unit 350, the ADF 60, the sorter 70, the two-side unit 80, a paper feed unit 360, drivers 370 and 380, and a signal processing circuit 390.

The operation board 310 is accessible for operating the machine and provided with keys for selecting desired operation modes, indicators and displays for displaying selected operation modes, a desired number of copies, failures which may occur in the machine, etc. The optics control board 320 controls a scanning motor M1 for driving the scanning system 30, and motors M2 and M3 for driving respectively the lens 35 and the second carriage in the event of a change of magnification. The AC control board 325 controls the quantity of light to issue from the lamp 31 via the lamp control board 330 and controls the temperature of a fixing heater HT1 associated with the fixing unit 12 and a drum heater HT2 accommodated in the drum 2 via the heater control board 340. The high-tension power supply unit 350 generates high-tension power to be applied to the main charger 3, a bias electrode 5a of a developing unit 5, the transfer charger 7, and the separation charger 8. Various AC loads 400 are connected to the driver 370 while various DC loads 410 are connected to the driver 380. Connected to the signal processing unit 390 are various kinds of sensors 420. Typical of the AC loads 400 are a main motor for driving the drum 2 in a rotary motion, a motor for driving the developing unit or cartridge 5, a motor for driving a fan motor for transport, and a fan motor for cooling. On the other hand, typical of the DC loads 410 are a solenoid for controlling a cleaning blade, a clutch for controlling the register roller 27, a clutch for controlling a paper feed roller, a solenoid for controlling a separator pawl, the eraser 4, a total counter, and a toner supply control solenoid. Further, the sensors 420 may be represented by a timing pulse generator for generating pulses in synchronism with the rotation of the main motor, a toner image sensor PSEN, a toner color sensor CSEN, a register sensor responsive to a paper sheet reached the neighborhood of the register roller 27, and a paper size sensor and a paper sensor which are associated with each of the paper feed sections.

Referring to FIG. 6, the operation of the microprocessor 210 on the main control board of FIG. 5 is outlined. First, what the various symbols shown in the figure refer to will be briefly described.

Ccopy: copy counter adapted to count the number that a copying cycle is completed. This counter is reset to zero when the copying process is completed a set number of times.

Nset: set copy number register loaded with the number of copies to be produced per document which is entered on numeral keys.

NK: numeral key input register for storing a numerical value which is entered on the numeral keys In FIG. 6, as the power supply of the machine is turned on, STEP SA1 is executed for initializing the CPU, i.e. the statuses of the main control board 200 itself. More specifically, in STEP SA1 the RAM 230 is cleared, various operation modes are initialized, and the output ports are reset. STEP SA1 is followed by STEP SA2 which is adapted to initialize the various boards connected to the main control board 200 as well as the various statuses (operation modes) of various units, thereby initializing the entire copier. At the same time, the timer 270 is loaded with a particular operation mode and a numerical value to count. Also performed in STEP SA2 are the processing associated with the start of serial communication between the main control board 200 and the operation board 310, optics control board 320 and AC system control board 325, as shown in FIG. 5, and the processing associated with the transmission of initial data. From the main control board 200 to the optics control board 320, for example, lens correction data is transmitted upon turn-on of the power supply, as indicated by SERIAL TXD (MAIN→OPTICS) in FIG. 15.

In STEP SA3, standby mode processing is executed. At this time, a copying operation is not under way and, therefore, the machine is held in a standby condition. First, the statuses of signals applied to various input ports are read and the results are written in the RAM 230. Then, a group of data adapted for output control which are stored in the RAM 230 beforehand are delivered to output ports which are individually associated with the data, whereby the units individually connected to the output ports are controlled. At the same time, the statuses of the input ports read and stored in the RAM 230 are determined to see if any failure has occurred. If a failure has occurred, predetermined failure processing is executed depending upon the kind of the failure. For example, when the paper sheets, toner or silicone oil for fixing toner has run out, there is produced on the operation board 310 a paper-end display, a toner end display or an oil end display with or without a message for urging a person to supply it. In the case of a failure which needs a serviceman such as the blowing of a fuse responsive to fixing temperatures or the burn-out of the lamp, the kind of the failure and a display for urging a person to call a serviceman are produced on the operation board 310. These display data are fed from the main control board 200 to the operation board 310 by serial communication. If no error is found, the statuses of the other input ports are determined and necessary processing is performed e.g., an input from the operation board 310 is processed (data from the operation board 310 are also fed to the main control board 200 by serial communication). By such processing, the statuses of various mode selection switches (not shown) provided on the operation board 310 are checked to determine processing to follow.

Figure 7B:
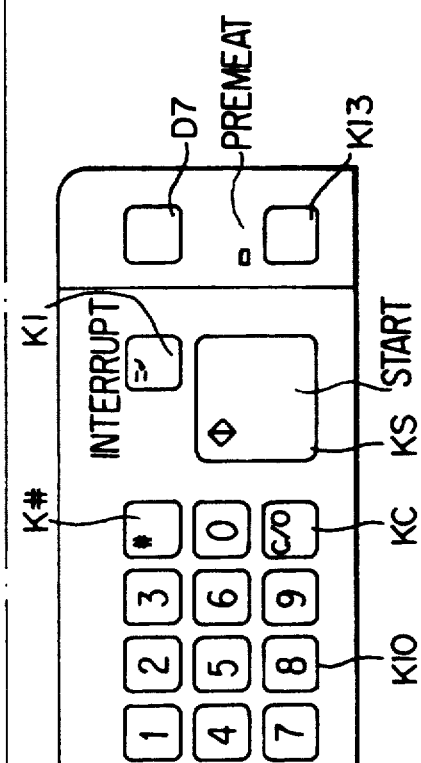
FIG. 7, consisting of FIGS. 7A and 7B, is a plan view of an operation board of the copier.

Subsequently, whether a key input has appeared is determined and, if the answer is YES, processing associated with the key input is executed. For example, when any of the numeral keys K10 (FIG. 7) is pressed in an ordinary operation mode, a numerical value associated with the pressed key is stored in the copy number register. In response to an input on a magnification key K6a or K6b, for example, magnification change data is fed to the optics control board 320 (see the serial signal shown in FIG. 15). Further, display data stored in the RAMs 230 and 290 beforehand are delivered to the operation board 310 by serial communication and at a predetermined timing, whereby the data are indicated by the indicators and displays on the operation board 310. The data to be displayed are formatted for the respective destinations depending upon the states of the mode switches. For example, a microprocessor included in the operation board 310 displays a set copy number on a display D1 and a magnification on a display D4. While the machine does not reach a ready condition or a print start key KS is not turned on, the standby mode SA3 is repeated (STEPs SA4 and SA5). The ready condition mentioned above will not hold when the fixing temperature does not lie in a predetermined range or when some failure is sensed, for example.

When the print start key KS is pressed under the ready condition, STEP SA6 for precopy mode processing is executed. This processing includes starting driving the main motor, cleaning the drum 2, and other operations for preparing for a copying operation. The desired number of copies (NK) entered on the numeral keys K10 is stored in the set copy number register Nset. Further, interrupt mask cancelling data is fed from the main control board 200 to the optics control board 320 by serial data communication (see FIG. 15). More specifically, since timing data are interchanged between the main control board 200 and the optics control board 320 by using an interrupt signal while a copying operation is under way, whether or not to validate the interrupt signal is determined on the basis of the data which is fed by serial data communication. That is, while the machine is in operation, the interrupt signal is validated to allow timing signals necessary for a copying operation to be interchanged and, in a standby condition, the interruption is masked because timing signals based on the interrupt signal are not necessary.

STEP SA6 is followed by SEP SA7 for copy mode processing. At this instant, an actual copying process is performed. The copy mode processing includes copy processing, paper transport processing, toner supply processing, and failure check processing. In the copy processing, the various process initialize, mechanically operated devices and paper feed devices are individually on-off controlled at predetermined timings which are synchronous with the outputs of the timing pulse generator. When a scanner start signal is fed in the form of an interrupt signal to the optics control board 320 at a predetermined timing, a leading edge (LE) signal is returned from the optics control board 320 to the main control board 200 as soon as the lamp arrives at the leading edge of an image. Upon reception of the LE signal, the main control board 200 corrects the value of the timing pulses to a predetermined value (1928 in the illustrative embodiment). Such pulse correction is performed for bringing an incoming paper sheet into register with an image which is formed on the drum 2.

More specifically, since an image representative of the leading edge of a document is formed on the drum 2 at the instant when the LE signal is received, the distance to a transfer position where the leading edge of the image meets the leading edge of the paper sheet can be calculated on the basis of the layout around the drum 2 which is shown in FIG. 4. Then, since the distance between the register roller and the transfer position is constant, the register start timing can be calculated from the LE timing (in the illustrative embodiment, assuming that the LE signal arrives at the 1928-th pulse, the start of register is effected at the 2000-th pulse so that the image is transferred just at the leading edge of the paper sheet. The copy mode processing is repeated until one copying cycle has been completed. After the copy mode processing has been ended (step SA8), the copy counter Ccopy is incremented by 1 (one) (STEP SA9) and the resulting count is compared with the content of the set copy number register Nset (STEP SA10). If the content of the copy counter Copy is not equal to the content of the set copy number register Nset, STEP SA7 is repeated to start another copying cycle. As soon as the counter Ccopy and the register Nset compare equal, i.e., when the copy mode processing S7 is completed for the final copy, the counter Ccopy is cleared (STEP SA11) and then STEP SA12 for postcopy mode processing is executed. This processing is adapted to discharge the paper sheet to which a toner image has been transferred, to clean the drum 2, etc. Upon discharge of the paper sheet (STEP SA13), the program returns to the standby mode processing of STEP SA3.

Figure 8:
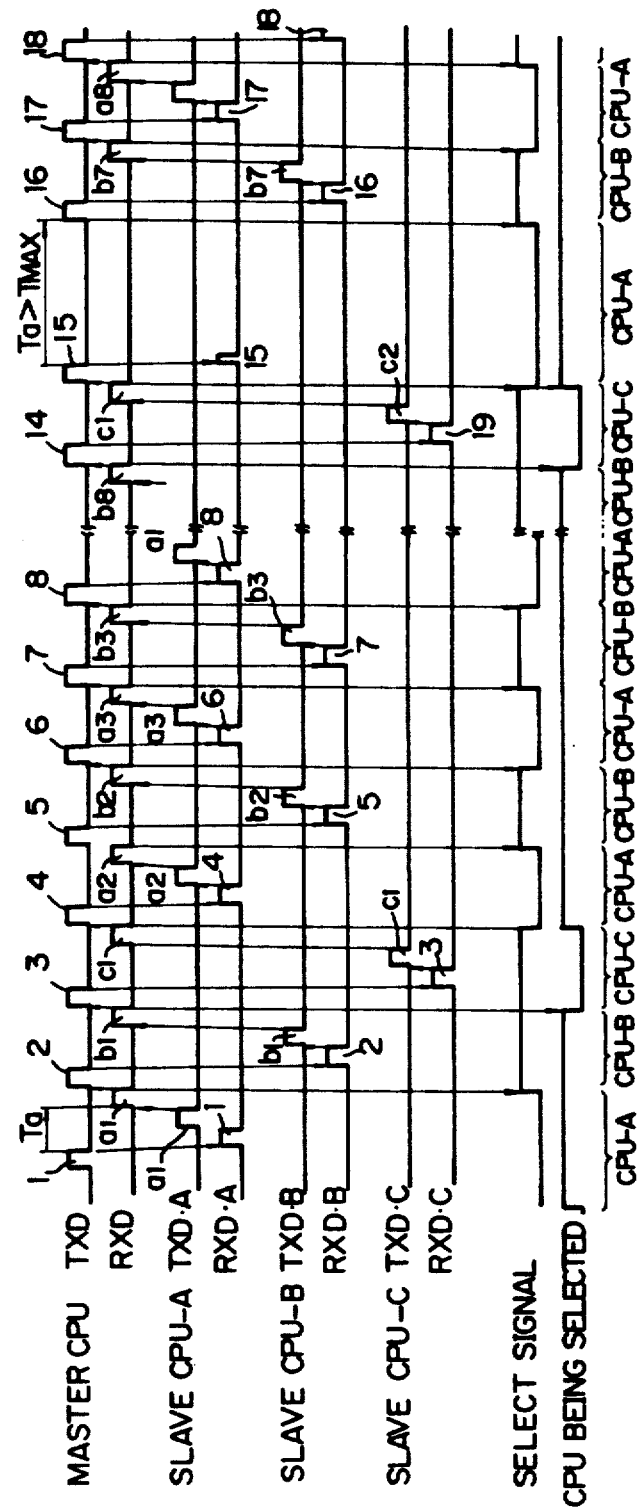
FIG. 8 is a timing chart representative of serial data communication between CPUs.

The serial data communication system is as follows. FIG. 8 is a timing chart representative of serial communication between one master CPU and three slave CPUs by way of example. FIGS. 9 to 14 are flowcharts demonstrating such serial communication. The operation will be described with reference to FIGS. 8 to 14.

Figure 9:
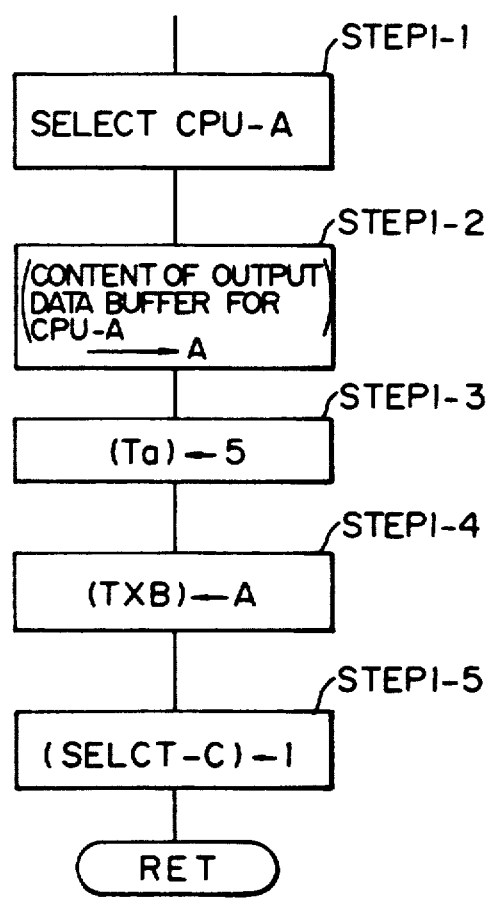
FIG. 9 is a flowchart demonstrating a routine which a master CPU performs for starting serial communication.

In FIG. 9, there is shown the processing for serial data communication which is effected by the master CPU. The serial data communication system in accordance with the present invention is such that as soon as data is received, data is sent out. However, immediately after the CPUs have been reset, it is necessary for the master CPU to transmit data and, therefore, the procedure shown in FIG. 9 is necessarily executed once.

STEP 1-1: The status of a select output for selecting a particular CPU to perform data communication for the first time (CPU-A in the illustrative embodiment) is determined.

STEP 1-2: Data to be fed to the slave CPU-A is read out of an internal buffer (RAM) and loaded in an accumulator.

STEP 1-3: A timer counter (Ta) for detecting a communication error (no response from the slave CPU-A) is loaded with "5". In the illustrative embodiment, since the timer counter is checked every 5 milliseconds and since it is loaded with "5", a communication is determined to have failed when 25 milliseconds expires before the arrival of a response from the slave CPU-A. However, the waiting time is not limited to 25 milliseconds and may be selected in conformity to an actual system configuration as desired.

STEP 1-4: The data loaded in the accumulator by STEP 1-2 is written in a serial transmission buffer (TXB). This condition is represented by TXD of MASTER CPU shown in FIG. 8 (1 in the figure). As the data is stored in the TBX once, a serial communication controller automatically sends the data stored in the TXB via a TXD terminal.

STEP 1-5: A select counter (SELECT-C) assigned to the slave CPU-C is loaded with an initial value of "1". The select counter SELECT-C may be used to determine priority order of the CPUs with respect to data communication. In the illustrative embodiment, it is assumed that the slave CPU-C needs only to communicate with the master CPU at a rate which is one-fifth of the communication rate of each of the slave CPU-A and CPU-B. More specifically, the slave CPU-C is assumed to communicate with the master CPU only once every time the slave CPU-A and CPU-B communicates with the master CPU five times each.

Figure 10B:
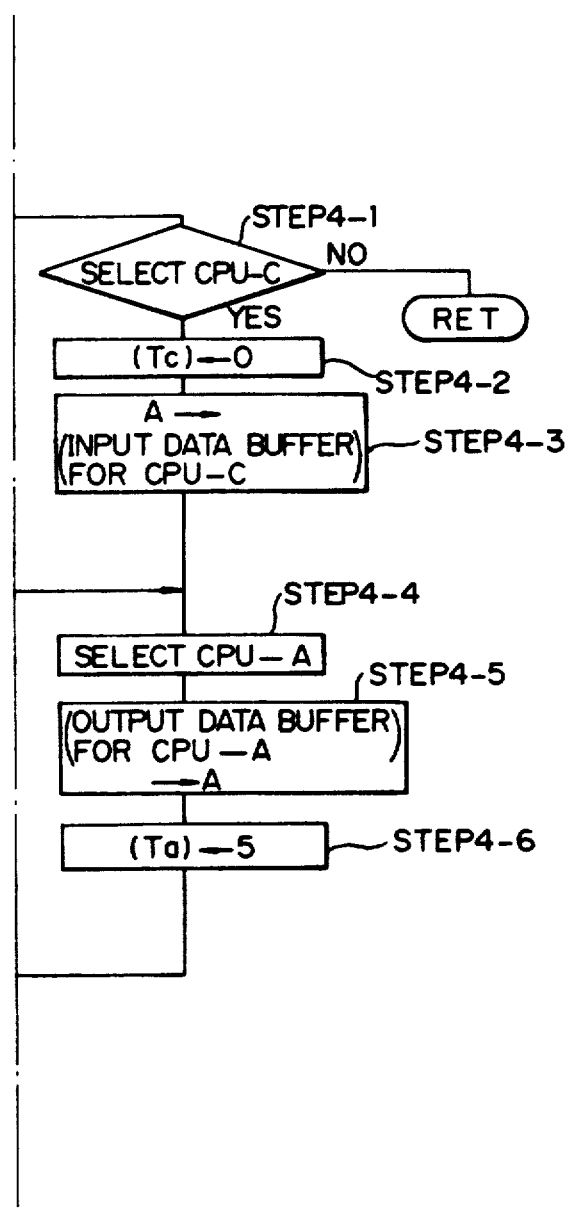
FIG. 10, consisting of FIGS. 10A and 10B, is a flowchart showing processing which the master CPU executes for serial communication.

FIG. 10 demonstrates the processing associated with the serial communication of the master CPU. The procedure shown in the figure is checked every time the processing of FIG. 9 is executed after the resetting of the master CPU.

STEP 2-1: Whether or not data has been lodged in a serial reception buffer (RXB) of the master CPU is determined and, if the answer is YES, the program advances to STEP 2-2. If the answer is NO, the operation is returned because no processing is needed. It is to be noted that STEP 2-1 may be omitted for a system of the type having a serial data reception interrupt or similar interrupt function because such a system is capable of calling steps which follow STEP 2-2 by a serial reception interrupt. Determining whether or not data has been lodged in the RXB in STEP 2-1 is represented by a1, b1, c1 and so on in RXD of MASTER CPU shown in FIG. 8.

STEP 2-2: Data entered the serial receive buffer RXB is loaded in the accumulator.

STEP 2-3: Whether the slave CPU being selected is the slave CPU-A is determined. If the answer is YES, meaning that the data received this time is from the slave CPU-A, STEP 2-4 is executed. If the answer is NO, the program is transferred to STEP 3-1.

Figure 11:
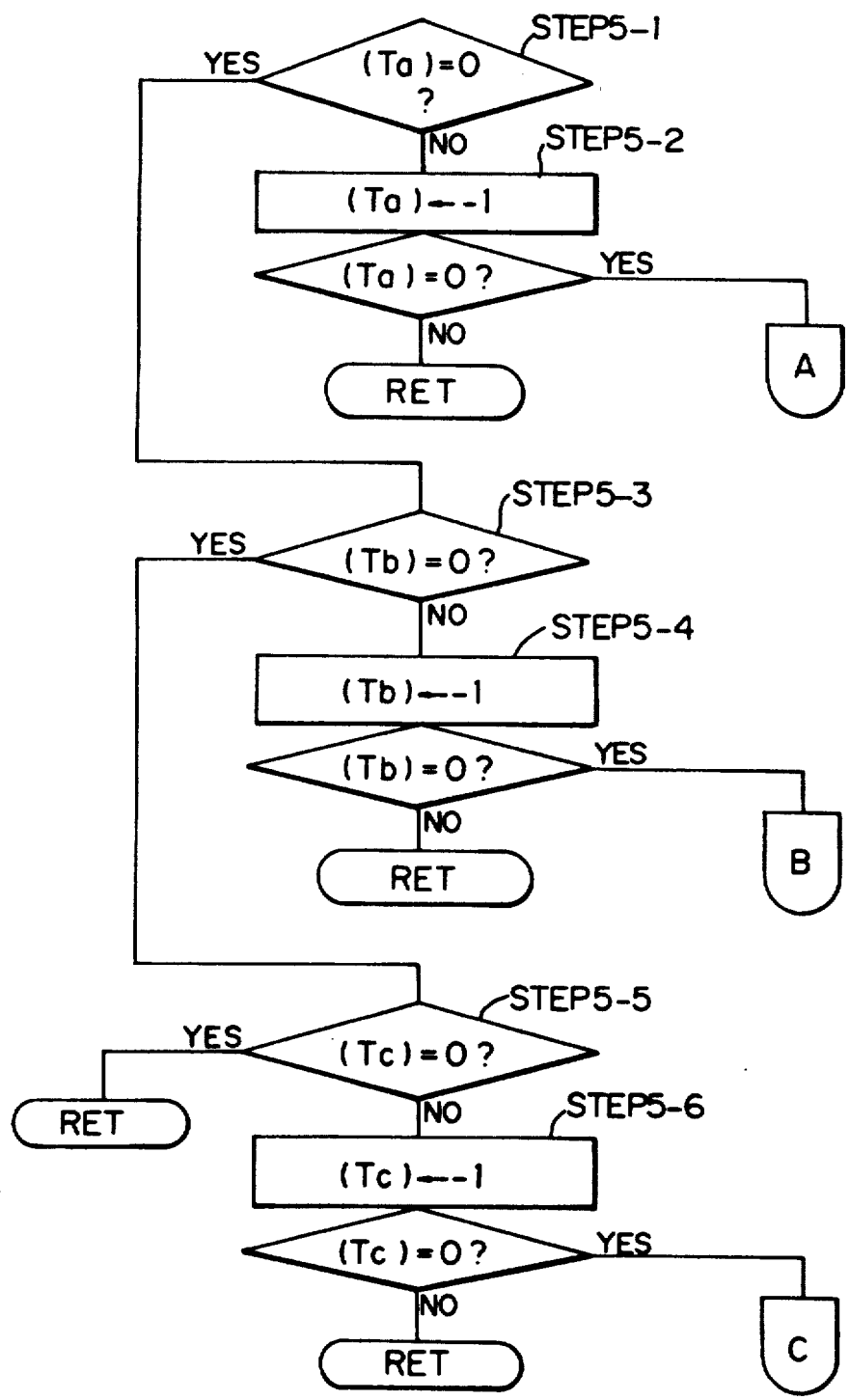
FIG. 11 is a timing chart useful for understanding a timer count processing routine.

STEP 2-4: Since the data received is from the slave CPU-A, the timer counter (Ta) assigned to the slave CPU-A for error checking purpose is reset. The timer counter Ta, Tb or Tc constantly checks the associated path for serial communication errors by performing down-counting and checking as shown in FIG. 11.

STEP 2-5: The data loaded in the accumulator by STEP 2-2 is saved in a buffer (RAM) which serves to store input data from the slave CPU-A.

STEP 2-6: By STEPs 2-1 to 2-5 shown in FIGS. 9 and 10 a set of data communication (from master CPU to slave CPU-A and from slave CPU-A to master CPU) has been completed. Then, the master CPU changes the select output for selecting the slave CPU-B to communicate next, whereby the slave CPU being selected by STEP 2-6 is changed to the slave CPU-B (see the point of FIG. 8 where the RXD of MASTER CPU has received a1).

STEP 2-7: Data to be fed to the slave CPU-B is transferred from internal buffer (RAM) to the accumulator.

STEP 2-8: "5" is set in the timer counter Tb which is associated with the slave CPU-B.

STEP 2-9: The data loaded in the accumulator is stored in the serial transmit buffer TXB. This condition is represented in TXD of MASTER CPU in FIG. 8 by the occurrence of 2, 3, . . . , 18.

STEP 3-1: This is the continuation of STEP 2-3. Whether the slave CPU being selected is the slave CPU-B is determined. If the answer is YES, meaning that the data received this time is from the slave CPU-B, the program advances to STEP 3-2. If the answer is NO, the program advances to STEP 4-1.

STEP 3-2: Since the serial data received is from the slave CPU-B, the timer counter Tb assigned to the slave SPU-B is reset.

STEP 3-3: The data loaded in the accumulator by STEP 2-2 is saved in a buffer (RAM) which is adapted to store input data from the slave CPU-B.

STEP 3-4: In a communication system which sequentially selects three slave CPUs as usual, the slave CPU-C will be selected after the slave CPU-B. In the illustrative embodiment, however, the system is such that only the slave CPU-C communicates with the master CPU less frequently than the other slave CPUs (because the slave CPU-C is controllable even by comparatively slow data interchange). Hence, in this step, the select counter SELECT-C for selecting the slave CPU-C is decremented by 1 and, then, if the resulting value is zero is determined. The select counter SELECT-C is loaded with a value for reducing the frequency of communication of the slave CPU-C; in the illustrative embodiment it is loaded with "5" because the rate of communication required of the slave CPU-C is one-fifth of the rate of communication of the other slave CPUs. When the select counter SELECT-C becomes zero, STEP 3-5 is executed for selecting the slave CPU-C. However, when it is not zero, the program is transferred to STEP 4-4 for selecting the slave CPU-A by skipping the selection of the slave CPU-C.

STEP 3-5: This step follows STEP 3-4 in which the condition SELECT-C=0 for selecting the slave CPU-C has been reached. Hence, the select counter SELECT-C is again loaded with "5" so as to reduce the frequency of communication of the CPU-C.

STEP 3-6: The select output is changed to select the slave CPU-C.

STEP 3-7: Data to be fed to the slave CPU-C is loaded in the accumulator from the internal buffer (RAM).

STEP 3-8: The timer counter Tc assigned to the slave CPU-C for detecting communication errors is loaded with "5".

STEP 4-1: This step is the continuation of STEPs 2-3 and 3-1. Whether the slave CPU being selected is the slave CPU-C is determined. If the answer is YES, meaning that the data received this time is from the slave CPU-C, the program is transferred to STEP 4-2. If it is NO, meaning that serial data has arrived despite that none of the slave CPU-A, CPU-B and CPU- has been selected, it is decided that the data received this time is ascribable to noise or similar cause and not correct. At this time, the program is returned without processing the input data.

STEP 4-2: Since the data received is from the slave CPU-C, the timer counter Tc assigned to the slave CPU-C is reset.

STEP 4-3: The data loaded in the accumulator by STEP 2-2 is saved in the buffer (RAM) which is adapted to store input data from the slave CPU-C.

STEP 4-4: The select output is changed to select the slave CPU-A.

STEP 4-5: The data to be fed to the slave CPU-A is transferred from the internal buffer (RAM) to the accumulator.

STEP 4-6: "5" is set in the timer counter Ta which is assigned to the slave CPU-A as previously stated.

FIG. 11 shows the procedure in which the master CPU checks and decrements the timer counters Ta, Tb and Tc which are individually assigned to the slave CPUs for detecting communication errors.

STEP 5-1: Whether the timer counter assigned to the slave CPU-A is zero is determined. If the timer counter Ta is zero, meaning that the master CPU is not communicating with the slave CPU-A, the program advances to STEP 5-3 for checking the slave CPU-B. If the timer counter Ta is not zero, meaning that the master CPU is communicating with the slave CPU-A, STEP 5-2 is executed to see if any communication error has occurred.

STEP 5-2: The timer counter Ta is decremented by 1 and then whether the counter Ta is zero is determined again. If the counter Ta is not zero, the program is returned because the counter Ta has not overflown. If the counter Ta is zero, i.e., if the counter Ta has overflown (this occurs when a response from the slave CPU-A does not arrive within 25 milliseconds), the master CPU decides that a serial communication with the slave CPU-A has not been successful, stops awaiting a response from the slave CPU-A, and jumps to STEP 2-6 of FIG. 10 for starting on a communication with the slave CPU-B.

STEPs 5-3, 5-4 and 5-5: The same steps as the STEPs 5-1 and 5-2 are executed with each of the slave CPU-B and CPU-C.

Figure 12:
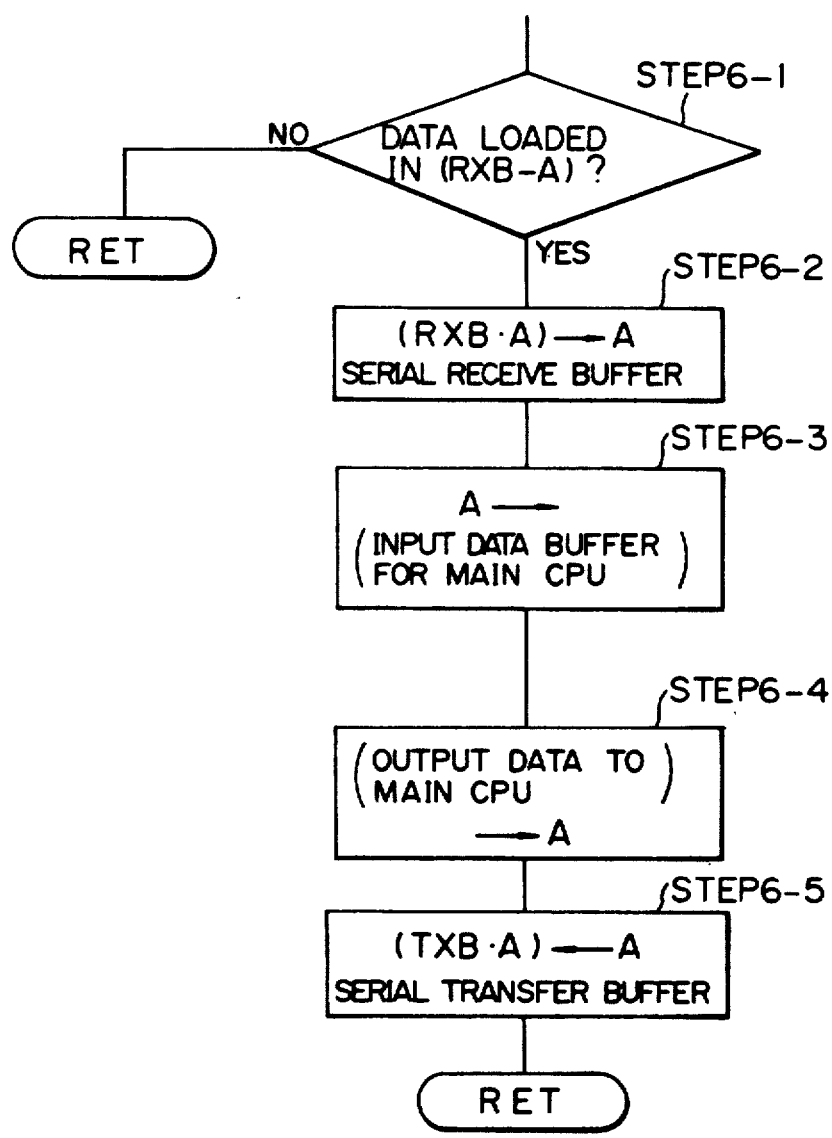
FIGS. 12, 13 and 14 are timing charts representative of receive and transmit processing routines which are associated with serial communication performed by a slave CPU-A, a slave CPU-B and a slave CPU-C, respectively.
Figure 13:
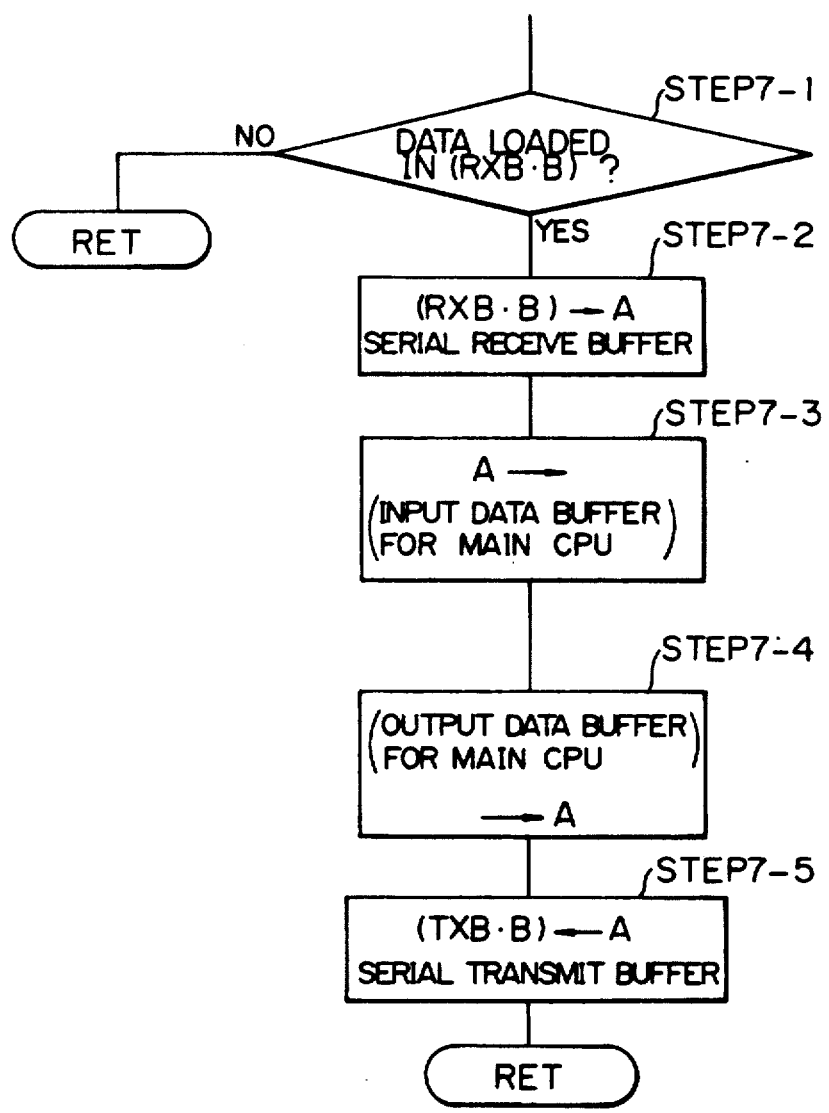
Figure 14:
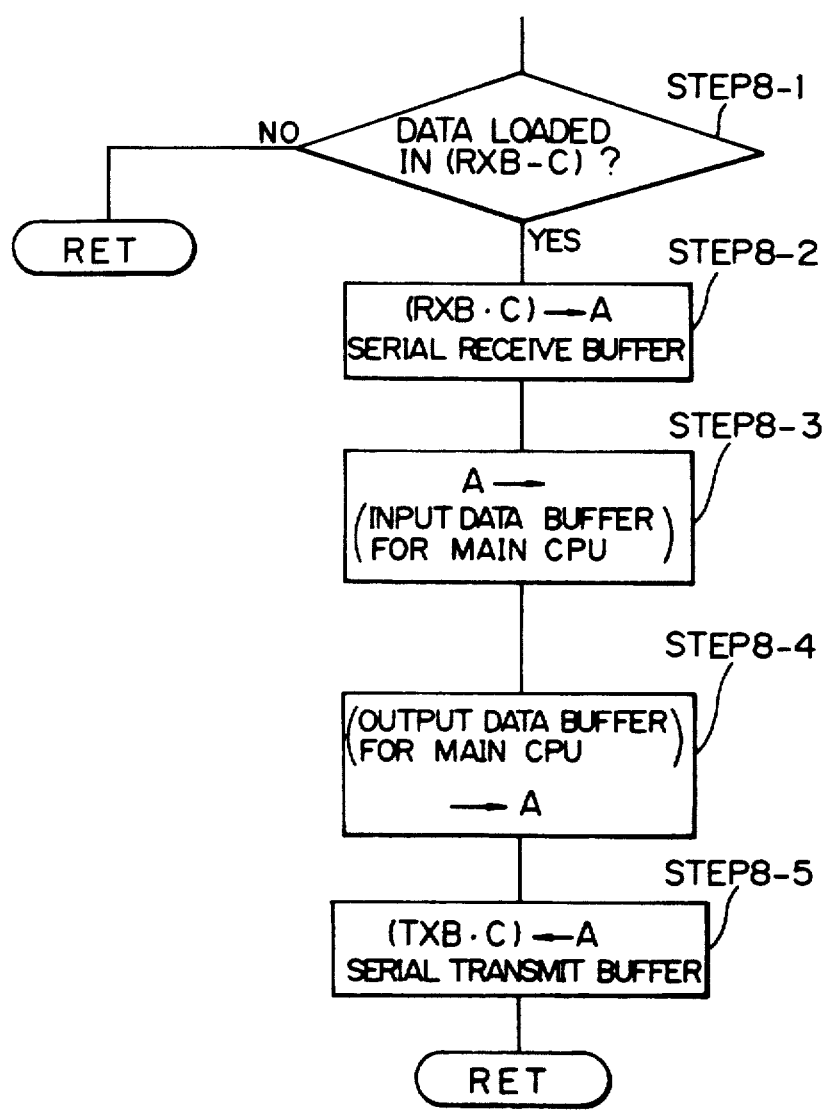

FIGS. 12, 13 and 14 show respectively the receive and transmit processing associated with the serial communication of the slave CPU-A, CPU-B and CPU-C with the master CPU. The following description will concentrate on the processing associated with the slave CPU-A shown in FIG. 12 by way of example.

STEP 6-1: Whether data from the master CPU has entered a serial receive buffer (RAM) of the slave CPU-A is determined and, if the answer is YES, STEP 6-2 is executed. If the answer is NO, the program is returned because no processing is needed. In a system having a serial data receive interrupt function or similar interrupt function, the decision in STEP 6-1 is omissible as with the master CPU. STEP 6-1 is represented by 1, 4, . . . in RXD-A of SLAVE CPU-A of FIG. 8.

STEP 6-2: Data entered the serial receive buffer (RXB-A) is loaded in an accumulator.

STEP 6-3: The data loaded in the accumulator in STEP 6-2 is saved in a buffer (RAM) which is adapted to store input data from the master CPU.

STEP 6-4: Data has to be transmitted to the master CPU because data has been received from the master CPU in STEPs 6-1 to 6-3. More specifically, in the serial data communication system of the present invention, a single master CPU and a plurality of slave CPUs communicate with each other by transmitting data immediately after receiving data and, therefore, each slave CPU has to send data to the master CPU as soon as it receives data from the master CPU. For this reason, the slave CPU-A loads the accumulator with data which is stored in an internal buffer (RAM) to be transmitted to the master CPU.

STEP 6-5: The data loaded in the accumulator is stored in a serial transmit buffer (TXB-A). This condition will be understood from a1, a2, . . . shown in TXD-A of slave CPU-A of FIG. 8.

The above procedure is repeated in STEPS 7-1 to 7-5 and STEPs 8-1 to 8-5.

The timing chart of FIG. 8 demonstrating the serial data communication will be described in detail. The timing chart shows a condition in which the master CPU has been reset. First, the master CPU selects the slave CPU-A and then transmits data (represented by 1 in the figure) to the slave CPU-A. In response to the data from the master CPU, the slave CPU-A delivers data (represented by a1) to be transmitted to the master CPU to TXD-A. Upon reception of the data from the slave CPU-A, the master CPU changes the select signal to select the slave CPU-B and then transmits data (represented by 2) to the slave CPU-B. As soon as the slave CPU-B receives the data from the master CPU at RXD-B thereof, it sends data (represented by b1) to the master CPU via TXD-B. In response to the data from the slave CPU-B, the master CPU checks the SELECT-C counter to see if the slave CPU-C should be selected. Since the SELECT-C counter is "1" immediately after the master CPU has been reset, the master CPU changes the select signal to select the slave CPU-C. Then, the master CPU sets "5" in the SELECT-C counter so that the slave CPU-C may be selected once every time the other slave CPUs are selected five times each. Thereupon, the master CPU sends data (represented by 3) to the slave CPU-C. As soon as the slave CPU-C receives the data from the master CPU at RXD-C thereof, it sends data (represented by c1) to the master CPU via TXD-C. Upon reception of the data from the slave CPU-C, the master CPU changes the select signal to select the slave CPU-A and then transmits data (represented by 4) to the slave CPU-A.

As described above, the master CPU sequentially performs serial data communications with the slave CPU-A, CPU-B and CPU-C, once with the slave CPU-C for five times of communication with each of the slave CPU-A and CPU-B.

When any of the slave CPUs fails to send a response due to a communication error or similar cause, the following procedure is executed.

Assume that data (represented by 15 in FIG. 8) meant for the slave CPU-A and transmitted from the master CPU has failed to reach the slave CPU-A due to a communication error, for example. In this condition, the slave CPU-A received no data from the master CPU does not send any response to the master CPU, as shown in FIG. 12. This is also true with the other slave CPUs. Then, the master CPU cannot send data to the next CPU because it does not receive any serial data, whereby the serial communication is practically disenabled. Should no processing be executed in such a condition, the data communication between the master CPU and the salve CPUs and therefore the entire system would practically fail to bring about an unusual mode which would would need a serviceman.

The illustrative embodiment of the present invention eliminates such an unusual mode by using the timer counters Ta, Tb and Tc which are individually associated with the slave CPUs, as stated earlier. Specifically, in FIG. 8, the master CPU loads the timer counter Ta with "5" while transmitting data (represened by 15) to the slave CPU-A, thereby defining the maximum waiting time. When the master CPU receives no response from the slave CPU-A, it checks the timer counter Ta every 5 milliseconds as shown in FIG. 11 and, as soon as the counter Ta reaches the maximum count (25 milliseconds in this embodiment), stops awaiting a response from slave SPU-A and, instead, selects the slave CPU-B to send data (represented by 16) to the slave CPU-B.

Figure 15:
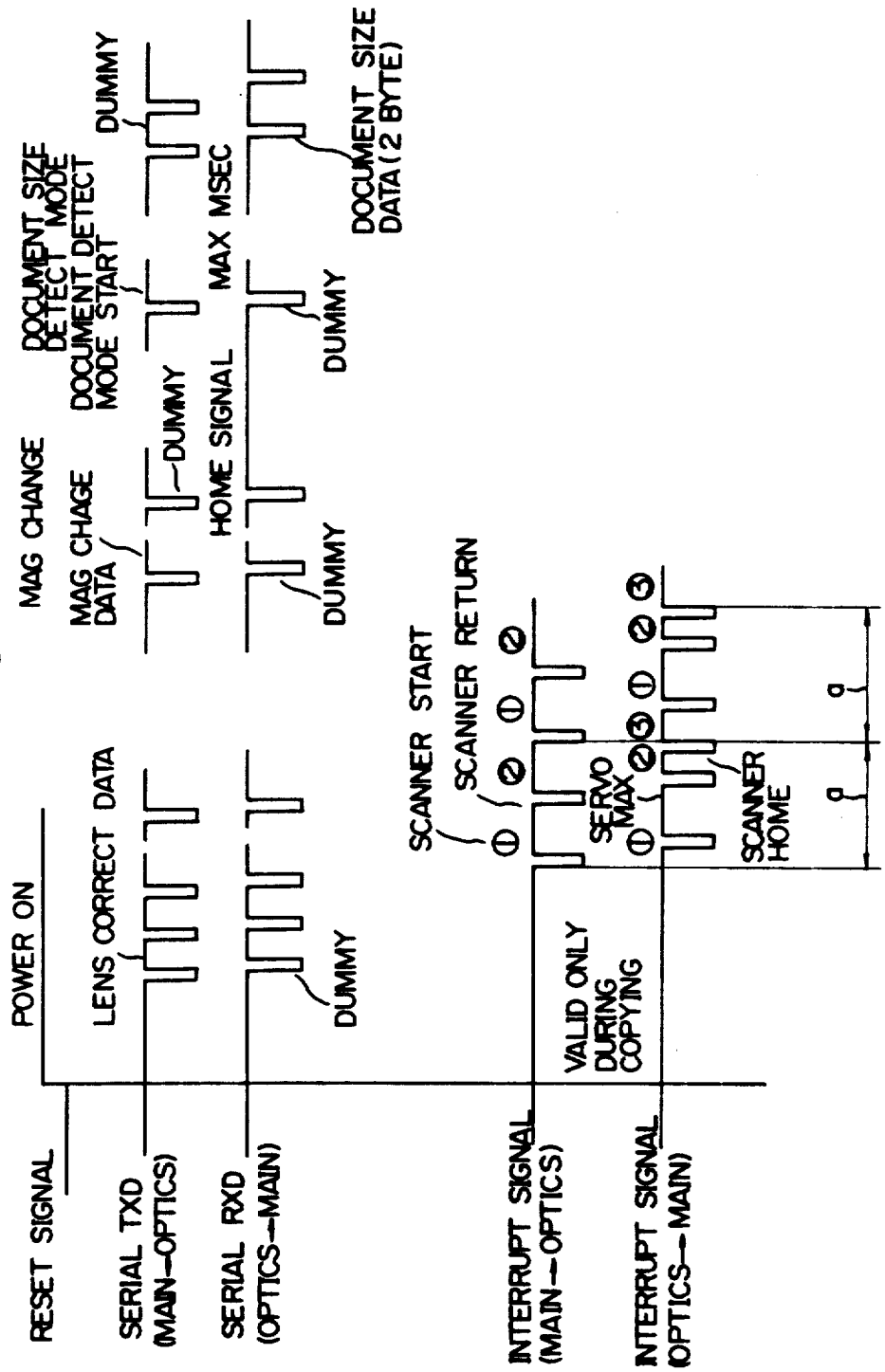
FIG. 15 is a timing chart demonstrating data communication held between the master CPU and the slave CPU-C.

Referring to FIG. 15, the data communication between the master CPU and the slave CPU-C (optics control CPU) is implemented by 8-bit serial data communication and two interrupt signal lines. Data and signals interchanged by 8-bit serial data communication are as follows.

(1) Master CPU→Optics CPU
1. magnification change data (50% to 200%)
2. lens correction: ×1 magnification data
3. lens correction: focal distance data
4. longitudinal magnification data
5. document size detection start signal
6. signal for requesting detected APS length data
7. signal for requesting detected APS width data
8. four kinds of signals associated with a sheet-through mode
9. interrupt mask cancel signal
10. interrupt mask signal
11. dummy signal.

(2) Optics CPU→Master CPU
1. detected APS length data
2. detected APS width data
3. document size data (length and width)
4. twelve kinds of failure signals
5. dummy signal.

The serial data communication is repeated at predetermined intervals. If there is no data to be transmitted when a communication timing is reached, a dummy signal is sent.

One of the two interrupt signal lines is assigned to the master CPU to the optics CPU interruption while the other is assigned to the optics CPU to the master CPU interruption. By the interrupt from the master CPU to the optics CPU, the following signals are transmitted:
1. scanner start signal
2. scanner return signal.

In order that the scanner start signal and the scanner return may be sent over a single interrupt signal line, data are sequentially transmitted under the following agreement. Specifically, the master CPU sends an interrupt mask cancel signal to the optics CPU, an interrupt signal which appears for the first time after the interrupt mask cancel signal is a scanner start signal, the second interrupt signal is a scanner return signal, the third interrupt signal is another scanner start signal, and the fourth interrupt signal is another scanner return signal. More specifically, a scanner start signal and a scanner return signal are alternately transmitted after a mask cancel signal in the form of sequential interrupt signals. Upon completion of a copying cycle, an interrupt mask signal is transmitted by serial communication to inhibit communications over the interrupt signal line. This is to prevent the scanner from malfunctioning in response to an interrupt signal which is ascribable to noise or similar cause.

By the interrupt from the optics CPU to the master CPU, the following signals are transmitted:
1. LE signal (representative of document leading edge)
2. servo MAX signal
3. scanner home signal.

The above three kinds of signals are sent from the optics CPU to the master CPU after a scanner start signal. The LE signal appears when the scanner reaches the leading edge of a document and is used to correct the operation timing of the sheet feed section such that a paper sheet is correctly positioned relative to an image on the drum 2. The servo MAX signal is indicative of the fact that the scanner is caused into a return stroke. The scanner home signal shows that the scanner has returned to its home position. In FIG. 15, a is representative of the EI section between the main CPU and the INT 2 interrupt.

Figure 16:
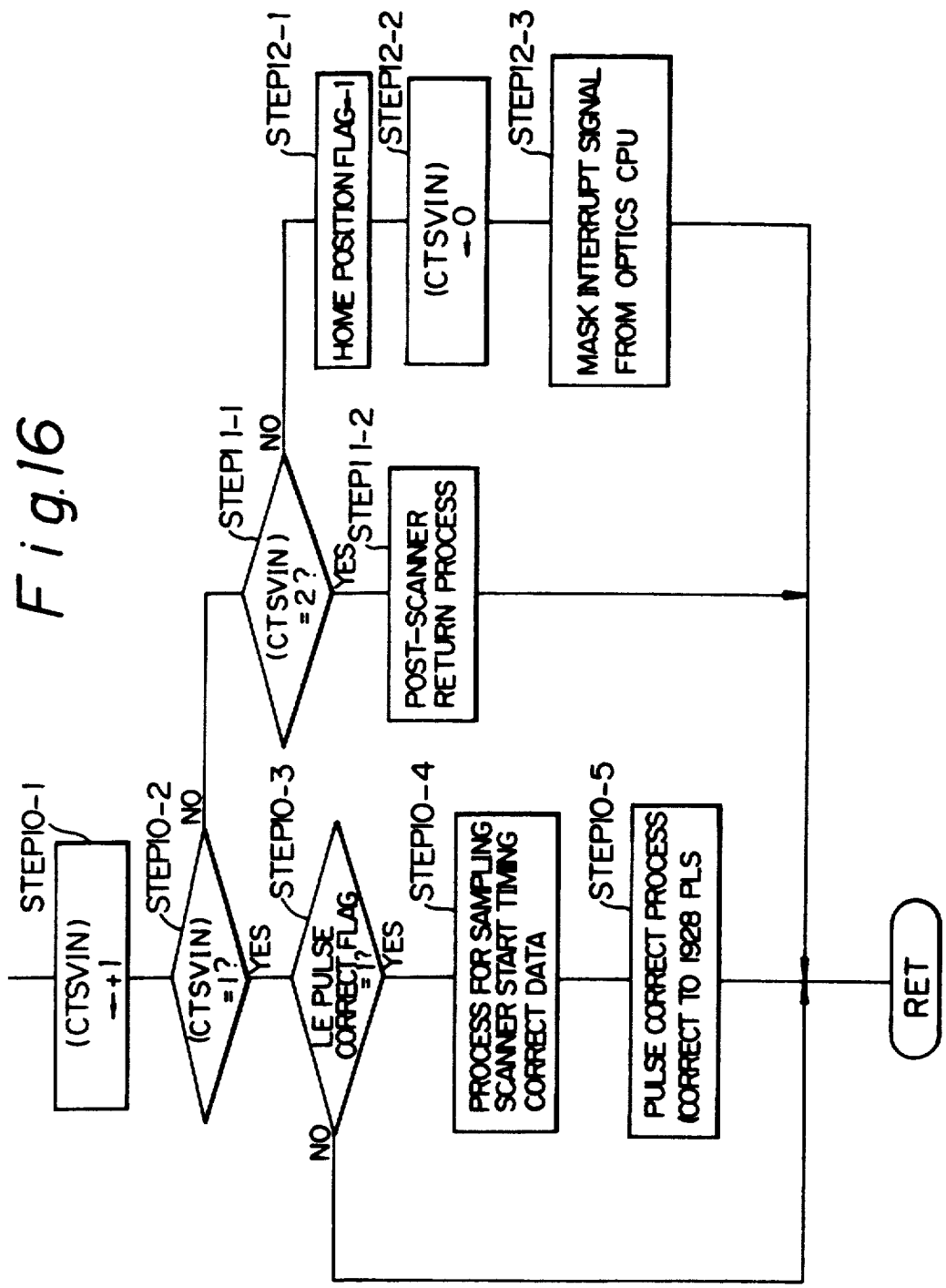
FIG. 16 is a flowchart representative of a processing routine which the master CPU executes in response to an interrupt signal from the optics control CPU.

Referring to FIG. 16, there is shown in a flowchart a procedure which the master CPU executes when it receives an interrupt signal from the optics CPU.

STEP 10-1: An interrupt receive counter (CTSVIN) responsive to interrupt signals from the optics CPU is incremented. More specifically, this counter CTSVIN is adapted to determine the kind of an interrupt signal (in terms of the order of occurrence) received from the optics CPU.

STEP 10-2: Whether the counter CTSVIN is "1" is determined. If the answer is YES, meaning that the interrupt signal from the optics CPU is an LE signal, STEP 10-3 is executed. If the answer is NO, the program is transferred to STEP 11-1.

STEP 10-3: STEP 10-3 and subsequent steps are executed when an LE signal is received. While the LE signal is adapted for pulse correction, conditions for not performing pulse correction are also checked in this step. Typical of such conditions is a centering mode or similar mode in which the leading edge of a paper sheet is intentionally shifted relative to the leading edge of an image.

STEP 10-4: Data sampling is performed for correcting the scanner start timing which is effected by the load (mechanical) of the scanner and motor characteristics.

STEP 10-5: Pulse correction is performed by using the LE signal. In this embodiment, an arrangement is made such that the pulses are corrected to 1928 by the LE signal to bring the leading edge of a paper sheet into accurate register with the leading edge of an image on the drum 2.

STEP 11-1: Whether the counter CTSVIN is "2" is determined. If the answer is YES, meaning that the interrupt signal from the optics CPU is a servo MAX signal, STEP 11-2 is executed. If the answer is NO, meaning that the received interrupt signal is a scanner home signal, STEP 12-1 is executed.

STEP 11-2: Processing associated with the reception of the servo MAX signal (return of the scanner) is performed.

STEPs 12-1, 12-2 and 12-3 are representative of a procedure which occurs upon reception of the scanner home signal. In STEP 12-1, a home position flag is set. When the home position flag is a (logical) ONE, a scanner start signal can be sent.

STEP 12-2: The counter CTSVIN is cleared.

STEP 12-3: By the steps described so far, an interrupt signal has been received three times from the optics CPU, i.e. LE signal, servo MAX signal, and scanner home signal. Then, the interrupt signal from the optics CPU is masked to eliminate malfunctions ascribable to noise or similar cause. The mask will be cancelled when a scanner start signal is sent to the optics CPU (see FIG. 17).

Figure 17:
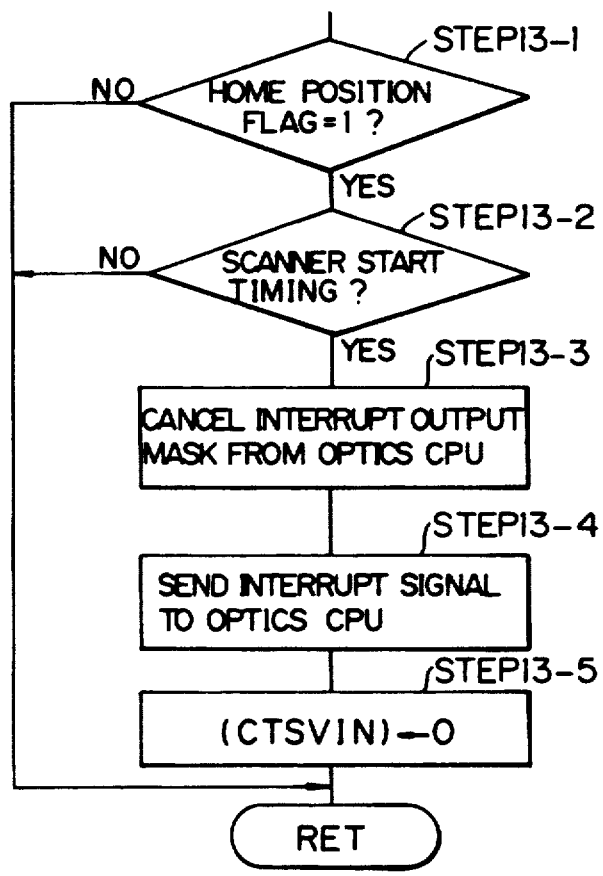
FIGS. 17 and 18 are flowcharts showing respectively a scanner start signal output processing routine and a scanner return signal output processing routine.
Figure 18:
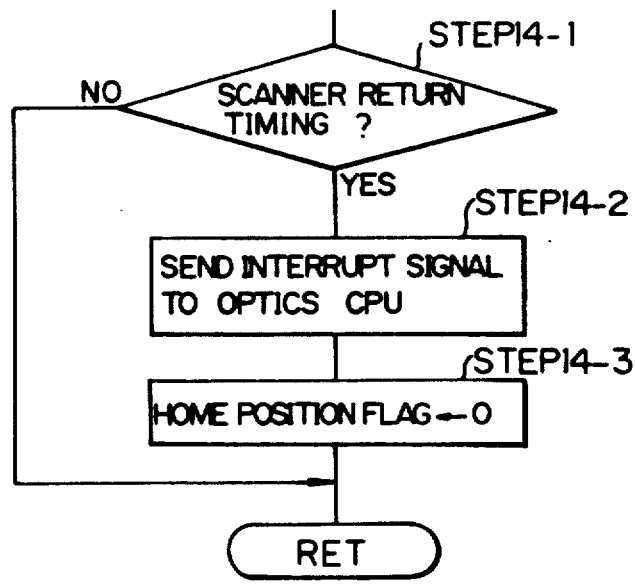

FIGS. 17 and 18 show how the master CPU transmits a scanner start signal and a scanner return signal to the optics CPU in flowcharts.

Figure 19A:
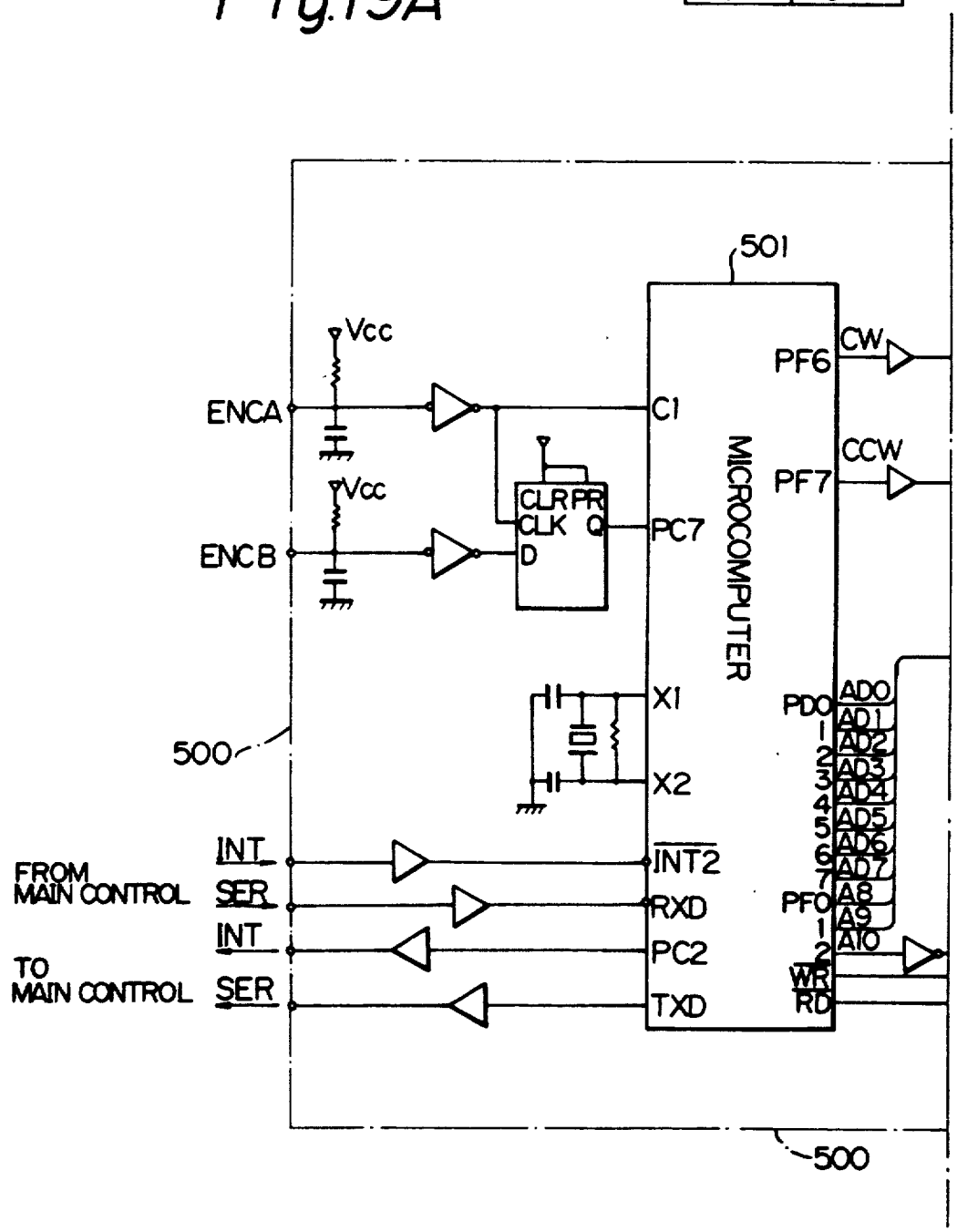
FIG. 19, consisting of FIGS. 19A and 19B, is a schematic diagram showing a specific construction of an optics control.
Figure 19B:
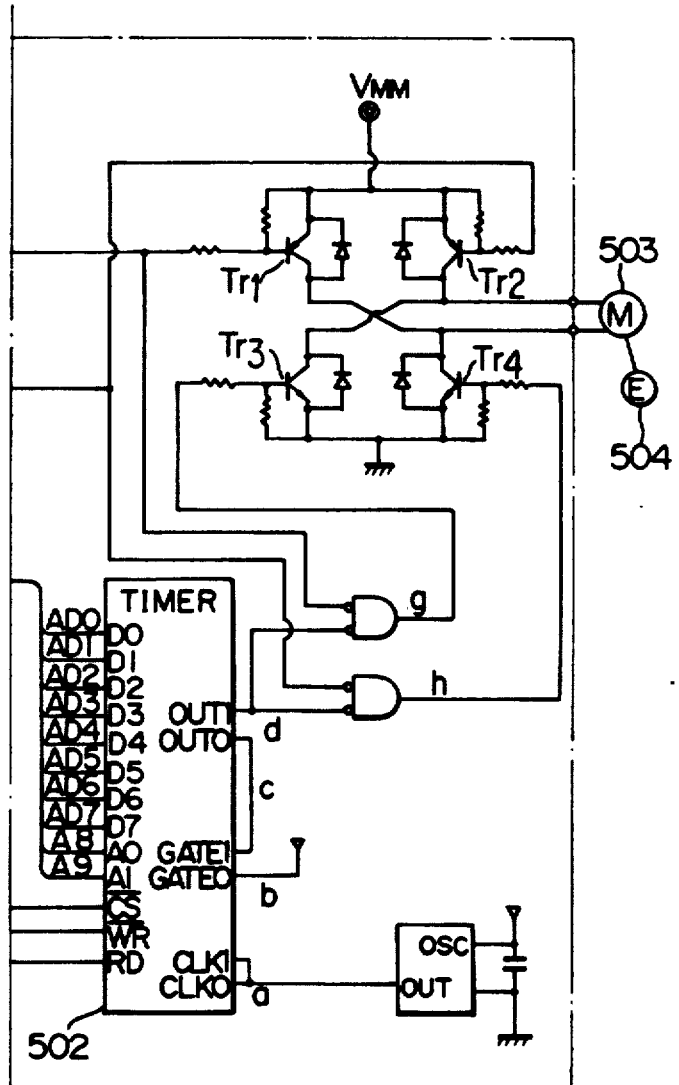

Referring to FIG. 19, an optics control circuit is shown and implemented by an optics control board 500. The optics control board 500 comprises a microcomputer 501, a programmable timer 502, a DC motor 503 for driving the scanner, and a rotary encoder 504 mounted on the DC motor 503. The encoder 504 generates an A-phase and a B-phase output signal ENCA and ENCB, respectively. Transistors Tr1 to TR4 are provided for driving the DC motor 503. When the transistors Tr1 and Tr3 are turned on and the transistors Tr2 and Tr4 are turned off, a current for causing the DC motor 503 into clockwise rotation flows. Conversely, when the transistors Tr2 and Tr4 are turned on and the transistors Tr1 and Tr3 are turned off, a current causing the DC motor 503 into counterclockwise rotation flows. The encoder 504 generates the two kinds of pulses ENCA and ENCB which are different in phase from each other, depending upon the amount and direction of rotation of the DC motor 503. The pulses ENCA are applied via a buffer to a terminal CI (Counter Input) while a counter built in the microcomputer 501 determines the interval of the pulses. The signal applied to the CI input also serves as an interrupt input. By the resulting interrupt processing, the velocity and timing of the scanner are controlled. The signals ENCA AND ENCB are fed to PC7 via a flip-flop so that their phase difference and therefore the direction of rotation of the DC motor 503 (direction in which the scanner is driven) is determined. The microcomputer 501 delivers data to the timer 502 while the transistors Tr1 To Tr4 are selectively turned on and off by an output d of the timer 502 and outputs PF6 and PF7. Consequently, the DC motor 503 is controlled by PWM (Pulse Width Modulation) control with respect to velocity.

The optics control and the main control are implemented by data communication which occurs over the two different kinds of signal lines, i.e. interrupt and serial signal lines.

Figure 20:
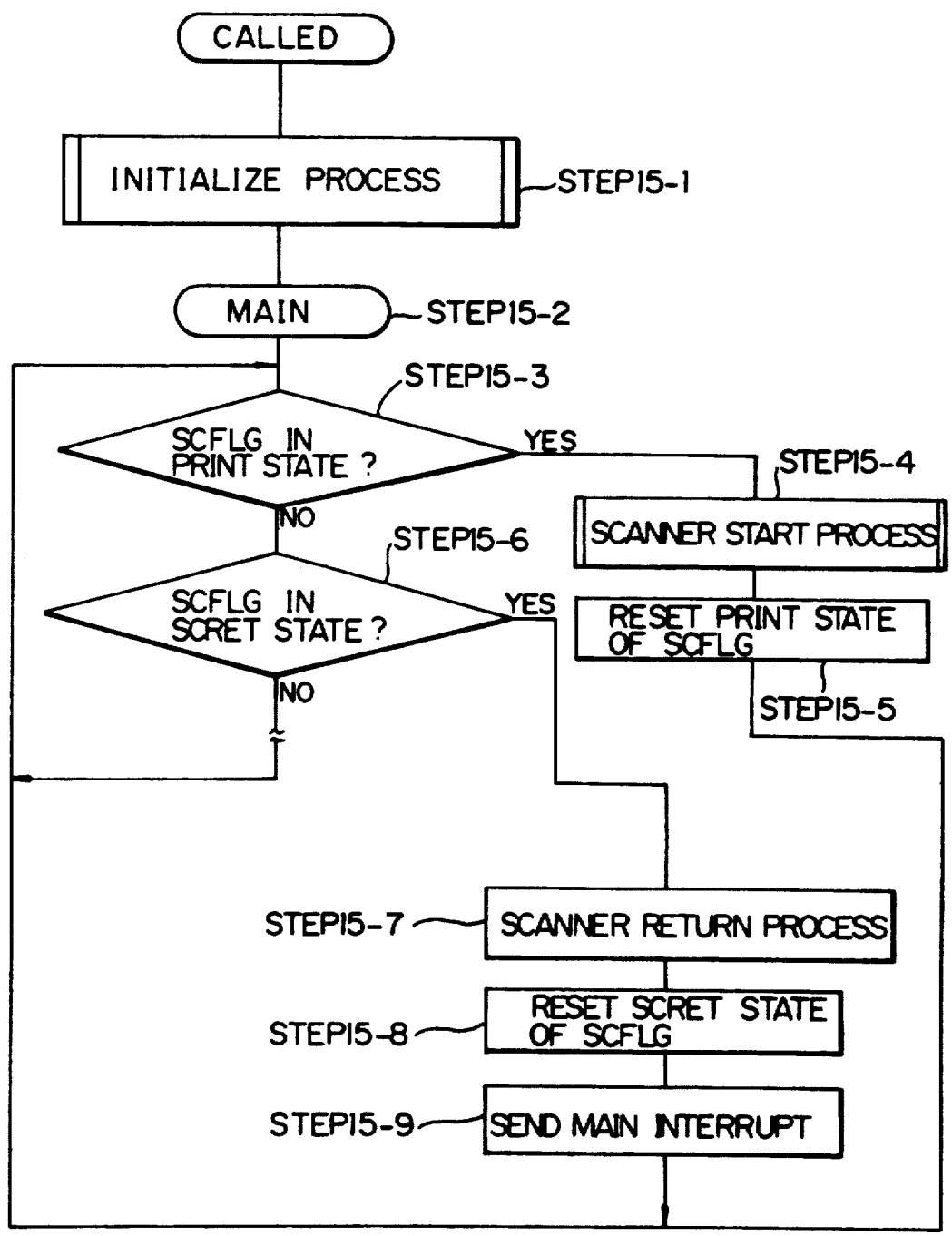
FIG. 20 is a flowchart showing a main routine of the optics control.

Referring to FIG. 20, the main flow of optics control is shown. An optics control program begins when the power supply of the machine is turned on. First, the program executes initialization which includes setting of the clear stack point of a RAM (STEP 15-1). The initialization is followed by a main section (STEP 15-2) in which a flag SCFLG is checked to see if it is in a print state (STEP 15-3). If the flag SCFLG is in a print state, scanner start processing is executed (STEP 15-4), then the print state is reset (STEP 15-2), and then the program is returned to STEP 15-2 (STEP 15-5). Subsequently, the flag SCFLG is checked to see if it is in a SCRET (scanner return) state (STEP 15-6) and, if the answer is YES, scanner return processing is executed (STEP 15-7), then the SCRET state is reset (STEP 15-8), and then an interrupt signal is fed to the main control to inform it of a start of the scanner (STEP 15-9). The other flags are checked and various kinds of processing associated therewith are executed in the same manner although details thereof will not be described herein. As discussed, every time a flag is set, the main control runs processing associated with the flag.

Hereinafter will be described the serial receive interruption. The data interchanged between the main control and the optics control in the illustrative embodiment and their contents are shown in FIGS. 22A and 22B.

Figure 21B:
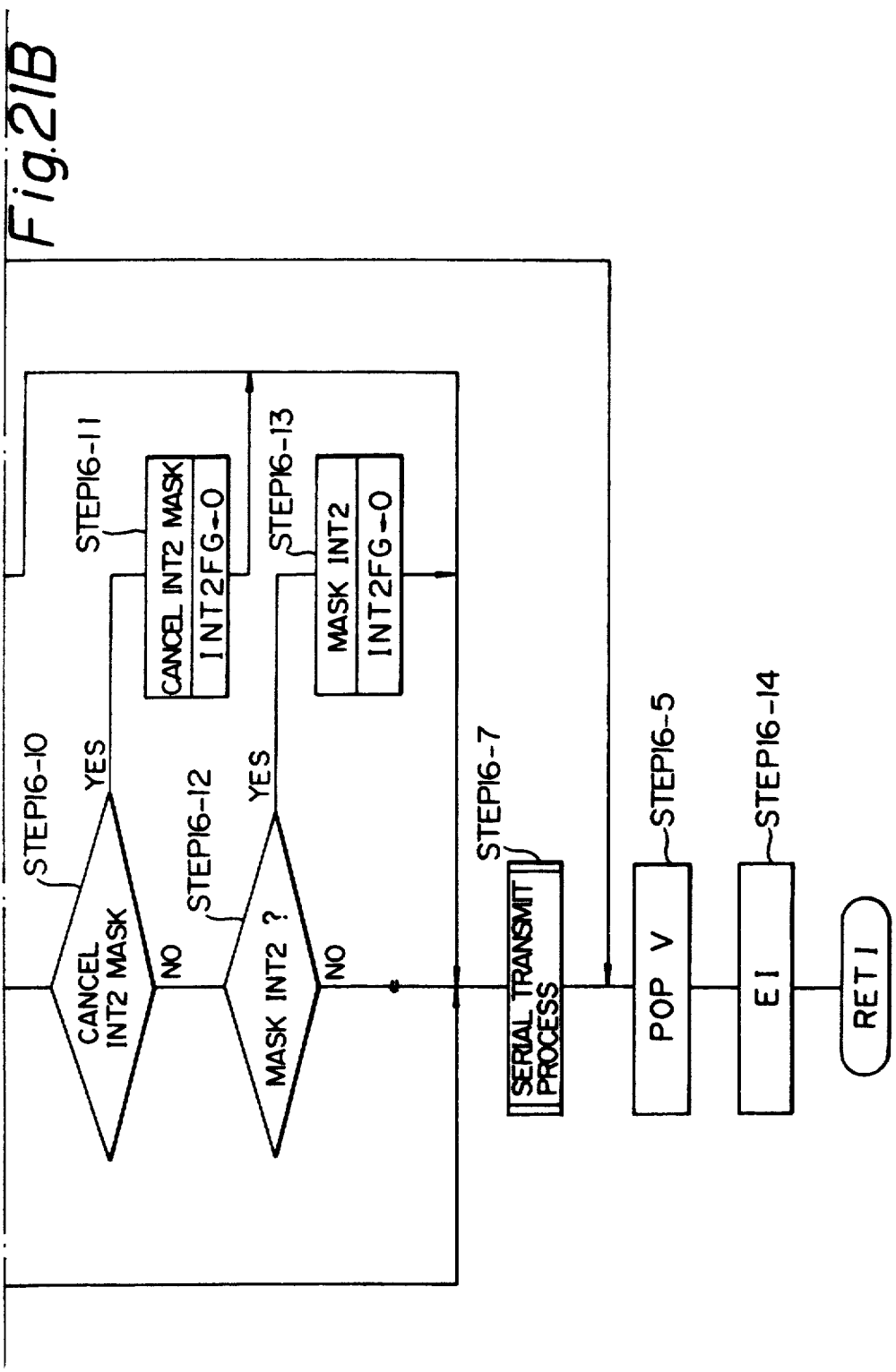
FIG. 21, consisting of FIGS. 21A and 21B, is a flowchart demonstrating a serial receive interrupt routine.

Referring to FIG. 21, when the main control sends a serial signal to the optics control, the optics control executes receive interrupt processing, i.e., it receives the data from the main control, discriminates the data, and executes a particular kind of processing associated with the data. The optics control completes the interrupt processing by sending necessary data to the main control. More specifically, in response to the serial receive interrupt, registers are retracted to a stack memory (STEP 16-1) and then the content of a receive buffer register (RXB) is loaded in an accumulator A (STEP 16-2). Thereafter, whether a reception error has occurred is determined (on the basis of parity check bits, for example) (STEP 16-3). If the answer is YES, a reception error code is sent to the main control (STEP 16-4), then the registers are restored, and then the interrupt processing is ended by determining that an interrupt is acceptable (STEP 16-5). If no reception error is present, the received data is checked to see if it is dummy data (STEP 16-6). If the received data is dummy data, the program executes a transmit processing routine which is associated with the transmission from the optics control (STEP 16-7). If the received data is not dummy data, it is discriminated with respect to kind so as to execute particular processing.

When the received data is a magnification change request (STEP 16-8), magnification change request processing necessary for shifting the lens and mirrors to those positions which are associated with the requested magnification is executed (STEP 16-9). If the received data is INT2 mask cancel data (STEP 16-10), a flag of a mask register associated with INT2 is reset to cancel the mask while, at the same time, INT2FG adapted to count the interrupts INT2 is cleared to a (logical) ZERO (STEP 16-11). INT2FG will be described in detail later in relation to INT2 interrupt processing. If the received data is INT2 mask data (STEP 16-12), the flag of the mask register associated with INT2 is set to effect interrupt masking (STEP 16-13). As described above, masking of the INT2 interrupt on the optics control side is controlled by mask cancel data and mask data which are fed from the main control. This is because the start and return timings of the scanner in accordance with the present invention are controlled by interrupts, i.e., noise introduced in the interrupt signal lines would cause the scanner to operate at unexpected timings.

Other various kinds of processing each being associated with different data are not shown in FIG. 21. After the data-by-data processing, the processing for transmitting data from the optics control to the main control is executed (STEP 16-7). In this manner, when the optics control has to transmit some data to the main control, it stores the data in a transmit buffer which is defined in its memory and, in response to a signal from the main control, sends the data to the main control by serial transmission. If there is no data to be transmitted, the optics control sends dummy data. Thereafter, the optics control restores the registers (STEP 16-5) and then ends this processing by allowing another interrupt (STEP 16-14).

Figure 23:
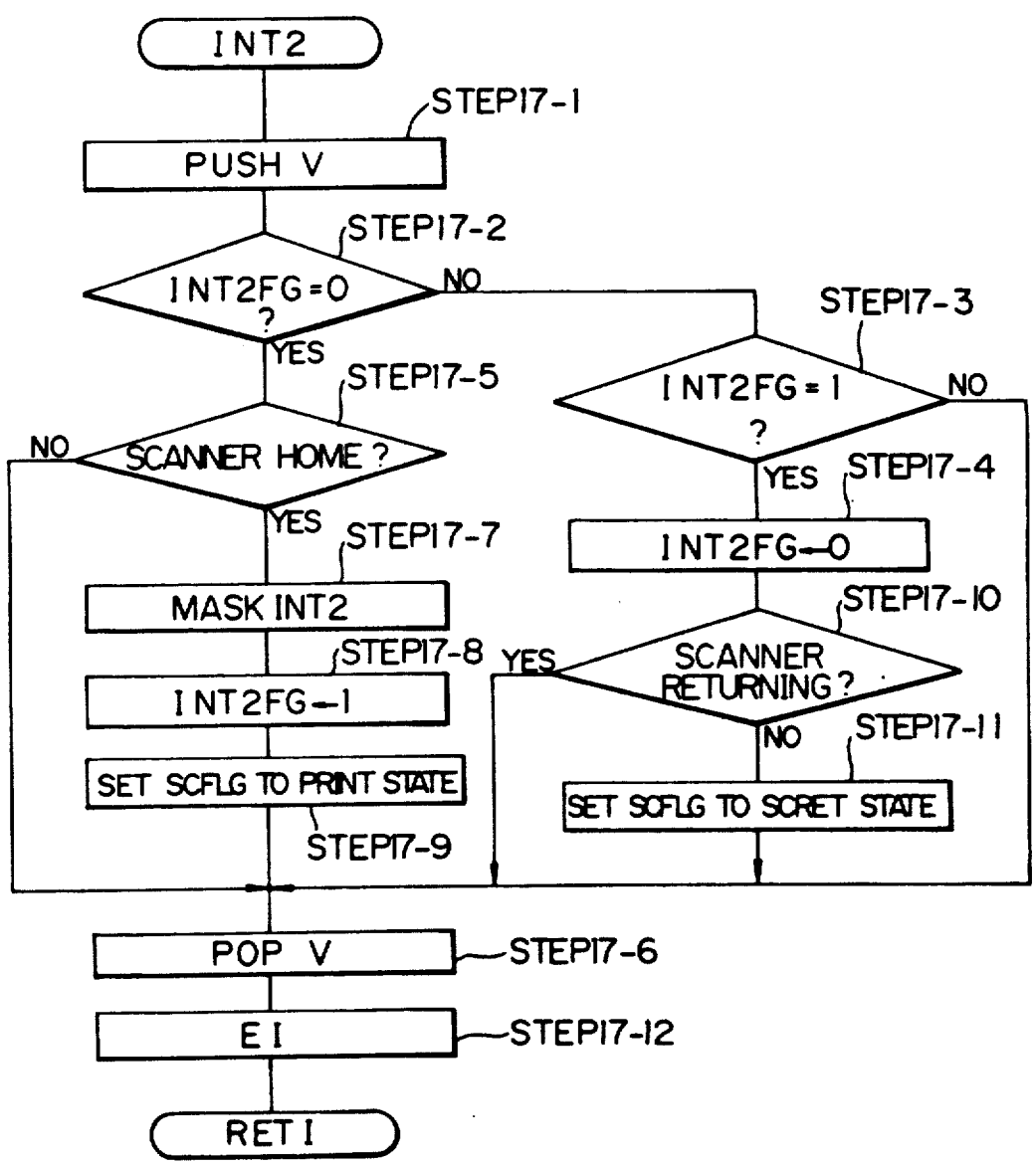
FIG. 23 is a flowchart demonstrating an INT2 interrupt routine.

Referring to FIG. 23, INT2 interrupt processing is shown and executed in response to interrupt signals which are fed from the main control to the optics control to command a scanner start and a scanner return. This processing occurs only when the INT2 interrupt mask is cancelled. As the program is transferred to the interrupt routine in response to an interrupt signal, it retracts the registers to the stack memory (STEP 17-1) and then determines if INT2 is a ZERO (STEP 17-2). The significance of the previously mentioned INT2FG is as follows. In accordance with the present invention, both of a scanner start and a scanner return are implemented by an interrupt signal and, therefore, the two different signals cannot be distinguished from each other by the presence/absence of a signal only. The present invention distinguishes a scanner start and a scanner return on the basis of the number of interrupts INT2 which have occurred after the transmission of an INT2 mask cancel signal from the main control. More specifically, INT2FG is cleared upon reception of a mask cancel signal so that an INT2 interrupt signal arrived when INT2FG is a ZERO is determined to be a scanner start signal. Upon arrival of the scanner start signal, INT2FG is set (STEP 17-3). On the other hand, an INT2 interrupt signal arrived when INT2FG is a ONE is regarded to be a scanner return signal and, at this instant, INT2FG is cleared (STEP 17-4). As described, INT2FG is used to identify a scanner start and a scatter return in distinction from each other.

When INT2FG is a ZERO, whether the scanner is in the home position is determined (STEP 17-5). If the answer is NO, the program decides that some failure has occurred and restores the registers by neglecting the interrupt signal, allows another interrupt, and ends the interrupt processing (STEP 17-6). If the scanner is in the home position, the program masks INT2 (STEP 17-7), sets INT2FG to a ONE (STEP 17-8), and sets the flag SCFLG to a print state (STEP 17-9). When the flag SCFLG which is a scanner flag for commanding the control over the scanner is caused into a print state, the scanner is started. This is executed by another program which is not shown or described herein. When the flag INT2FG is not a ZERO, whether the flag INT2FG is a ONE is determined (STEP 17-3). If it is not a ONE, the program is transferred to STEP 17-16 without executing any processing by deciding that some program error has occurred. If the flag INT2FG is a ONE, the program clears it to a ZERO (STEP 17-4) and sees if the scanner has started a return stroke (STEP 17-10). If the scanner is returning, the program returns to STEP 17-6. If the scanner is not returning, the flag SCFLG is set to a SCRET state (STEP 17-11). At this time, scanner return processing is executed by another program. Here, that the scanner is returning means that the scanner has reached the maximum movable distance (SCANNER MAX) before the transmission of a return signal from the main control to the optics control and the optics control has brought the scanner into a return state itself.

Figure 24B:
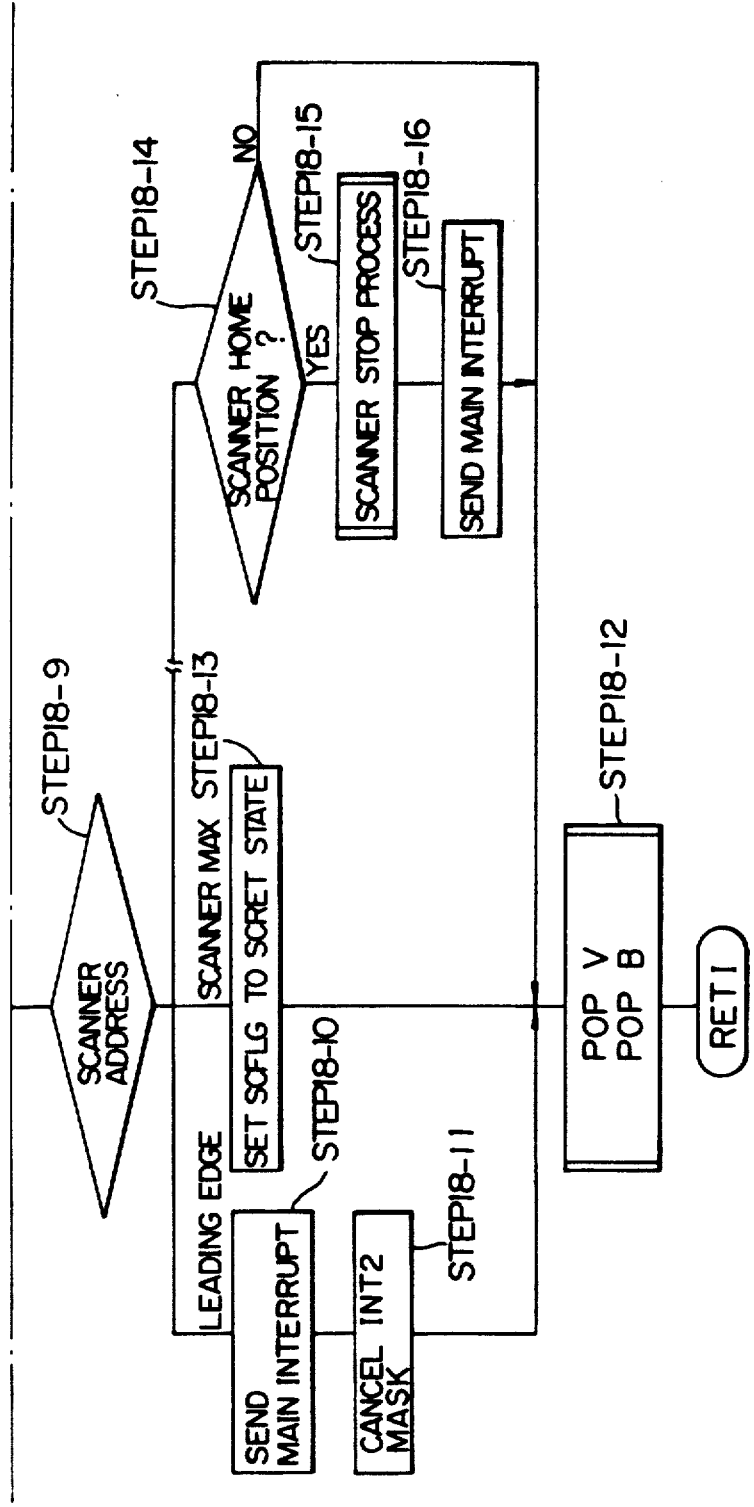
FIG. 24, consisting of FIGS. 24A and 24B, is a flowchart showing an encoder interrupt processing routine.

Referring to FIG. 24, encoder interrupt processing is shown. The scanner of the optics is controlled by the optics control and driven by the DC motor 503 (FIG. 19). The velocity of the scanner is measured in terms of an output signal of the rotary encoder 504 which is mounted on the DC motor 503. The encoder signal is coupled to the CI interrupt input of the microcomputer 501. The resulting interrupt processing is the encoder interrupt processing. Major functions assigned to this interrupt processing are (1) measuring the interrupt interval (interval of encoder signal) and determining the scanner velocity based on the measured interrupt interval for controlling the scanner velocity, and (2) counting the interrupts (encoder signal inputs) to determine a distance of the scanner from the home position and controlling the timings of the optics in a copying operation on the basis of the determined distance.

More specifically, when an encoder interrupt signal does not arrive over a predetermined period of time, a watch dog timer responsive to a failure is reset and started (STEP 18-1). This is followed by determining whether the direction of drive of the scanner is forward or reverse (STEP 18-2). The scanner address is incremented (STEP 18-3) or decremented (STEP 18-4) in response to every interrupt input. Then, whether the calculation associated with the scanner velocity control has been ended is determined (STEP 18-5) and, if the answer is NO, the interrupt processing is ended. This is because the calculation associated with the scanner velocity control needs a substantial period of time and because an interrupt is allowed before the calculation begins; should this interrupt occur (multiple interrupts) during calculation, the calculation would be disturbed. Nevertheless, the scanner address is continuously incremented or decremented to insure accurate timing control. If the scanner velocity calculation has been ended, registers are retracted to the stack memory, then an interrupt is allowed, and scanner velocity calculation is performed (STEPs 18-6 to 18-8). Thereafter, timing control is executed after checking the scanner address (STEP 18-9).

As the scanner reaches the leading edge of a document image, an interrupt output is fed to the main control (STEP 18-10). In response, the main control controls the copying sequence on the basis of the interrupt signal. Thereupon, the INT2 interrupt masking effected by the IN2 interrupt processing is canceled (STEP 18-11), the registers are restored, and the interrupt processing is ended (STEP 18-12). When the scanner has reached the maximum allowable distance (SCANNER MAX) before the arrival of a return signal from the main control, the SCFLG flag is set to a SCRET state (STEP 18-12). In this condition, the scanner return processing is executed by another program. As soon as the scanner returns to the home position (STEP 18-14), the scanner is stopped (STEP 18-15) and an interrupt output is sent to the main control to inform it of the arrival of the scanner as the home position (STEP 18-16).

In summary, in accordance with the present invention, while a plurality of different kinds of data are interchanged by serial communication which occurs at predetermined intervals, only urgent data are interchanged by interrupt signals which are implemented by interrupt communication. Hence, both of ordinary data and urgent data can be interchanged by a simple hardware construction to promote efficient and cost-effective data communication between multiple CPUs in actual machine control or similar control. Further, since whether or not to validate an interrupt signal (whether or not to mask an interrupt) is determined on the basis of data sent by serial data communication, a minimum of malfunctions ascribable to noise and other error signals which is particular to interrupt data communication is allowed to occur and, hence, the communication is stabilized.

Various modifications will become possible for those skilled in the art after receiving the teachings of the present disclosure without departing from the scope thereof.

What is claimed is:

1. A data communication system comprising:
    a plurality of interconnected CPUs, each of said CPUs having serial and interrupt data communication ports;
    a plurality of inhibit means with at least one of said inhibit means being in each of said CPUs with said inhibit means located in a given CPU, for masking interrupts received at said interrupt data communication port, of said CPU based upon data received from said serial communication port of each of said CPU;
    interconnection means for connecting from said serial port within each CPU to said inhibit means in each CPU and for providing a transmission path for masking and unmasking commands which are based upon data received by said serial port in each CPU; and
    communication processing means contained within each of said CPU to cause each of said respective CPU to accept a first type of data, denominated as ordinary data, from the serial port of said respective CPU when a mask command is present and to accept a second type of data, denominated urgent data, at least at said interrupt port when an unmask command is present at said serial port; and
    wherein said second type of data is emergency timing signal data.

2. A data communication system as claimed in claim 1, wherein said CPUs comprise a master CPU and an optics control CPU which are built in a copier.

3. A data communication system as claimed in claim 1, wherein the urgent data comprise timing signals.

4. A data communication system as claimed in claim 1, wherein said inhibit means further comprises:
    a means for accepting interrupt signals based upon an interrupt masking which validates any interrupt signals received at said interrupt data communication port and for rejecting any interrupt signals received at said interrupt data communication port responsive to the cancellation of the mask signal.

* * * * *